United States Patent [19]
Cameron et al.

[11] Patent Number: 5,832,459
[45] Date of Patent: Nov. 3, 1998

[54] COMPUTERIZED SOURCE SEARCHING SYSTEM AND METHOD FOR USE IN AN ORDER ENTRY SYSTEM

[75] Inventors: Paul Scott Cameron, Minneapolis; John Charles Nash, Shoreview; Robert Christopher Bloomer, Little Canada; Robert Edward Wollan, Minneapolis; Kelly Marie Kreutter, Minnetonka; Melinda Ann Ahler Olmstead, Shoreview; Dale Harry Renner, Edina; Ryan Douglas Bourne, Eden Prairie; Keith Michael Carnish, Minneapolis; Dean Richard Jones, St. Louis Park, all of Minn.

[73] Assignee: Andersen Consulting LLP, Chicago, Ill.

[21] Appl. No.: 696,779

[22] Filed: Aug. 13, 1996

Related U.S. Application Data

[62] Division of Ser. No. 293,470, Aug. 19, 1994, Pat. No. 5,592,378.

[51] Int. Cl.[6] .................................................... G06F 17/60
[52] U.S. Cl. ................................................ 705/26; 705/27
[58] Field of Search .................................... 705/1, 14, 26, 705/27; 707/1, 2, 3, 4, 5, 6, 10, 100, 104

[56] References Cited

U.S. PATENT DOCUMENTS

| | | | |
|---|---|---|---|
| 4,490,810 | 12/1984 | Hon | 463/43 |
| 4,734,858 | 3/1988 | Schlafly | 235/380 |
| 4,775,935 | 10/1988 | Yourick | 345/357 |
| 4,803,348 | 2/1989 | Lohrey et al. | 235/381 |
| 4,887,208 | 12/1989 | Schneider | 705/28 |
| 4,984,155 | 1/1991 | Geier et al. | 705/26 |
| 4,992,940 | 2/1991 | Dworkin | 705/26 |
| 5,146,404 | 9/1992 | Calloway | 705/1 |
| 5,168,445 | 12/1992 | Kawashima et al. | 705/10 |
| 5,241,464 | 8/1993 | Greulich et al. | 705/26 |
| 5,283,731 | 2/1994 | Lalonde et al. | 705/1 |
| 5,309,355 | 5/1994 | Lockwood | 705/6 |
| 5,319,542 | 6/1994 | King, Jr. et al. | 705/27 |

*Primary Examiner*—Stephen R. Tkacs
*Attorney, Agent, or Firm*—Merchant, Gould, Smith, Edell, Welter & Schmidt, P.A.

[57] ABSTRACT

A computerized source searching system and method for the placement of an order for at least one offer via a terminal having a display is disclosed. The system includes system storage for storing offer information, and for storing electronic reproductions of offer sources corresponding to the offer information. The system includes source searching capabilities for locating an offer source, including a display for displaying electronic offer source images, a filtering mechanism for displaying electronic offer source images corresponding to entered source search criteria, and a selection mechanism for selecting one of the electronic offer source images displayed. One or more of the offers associated with the selected electronic offer source image can be located by displaying a segment of the electronic offer source image, and selecting one or more offers in that segment. A user can thereby locate an offer by searching through an electronic equivalent of the offer source used by the person placing the order.

34 Claims, 41 Drawing Sheets

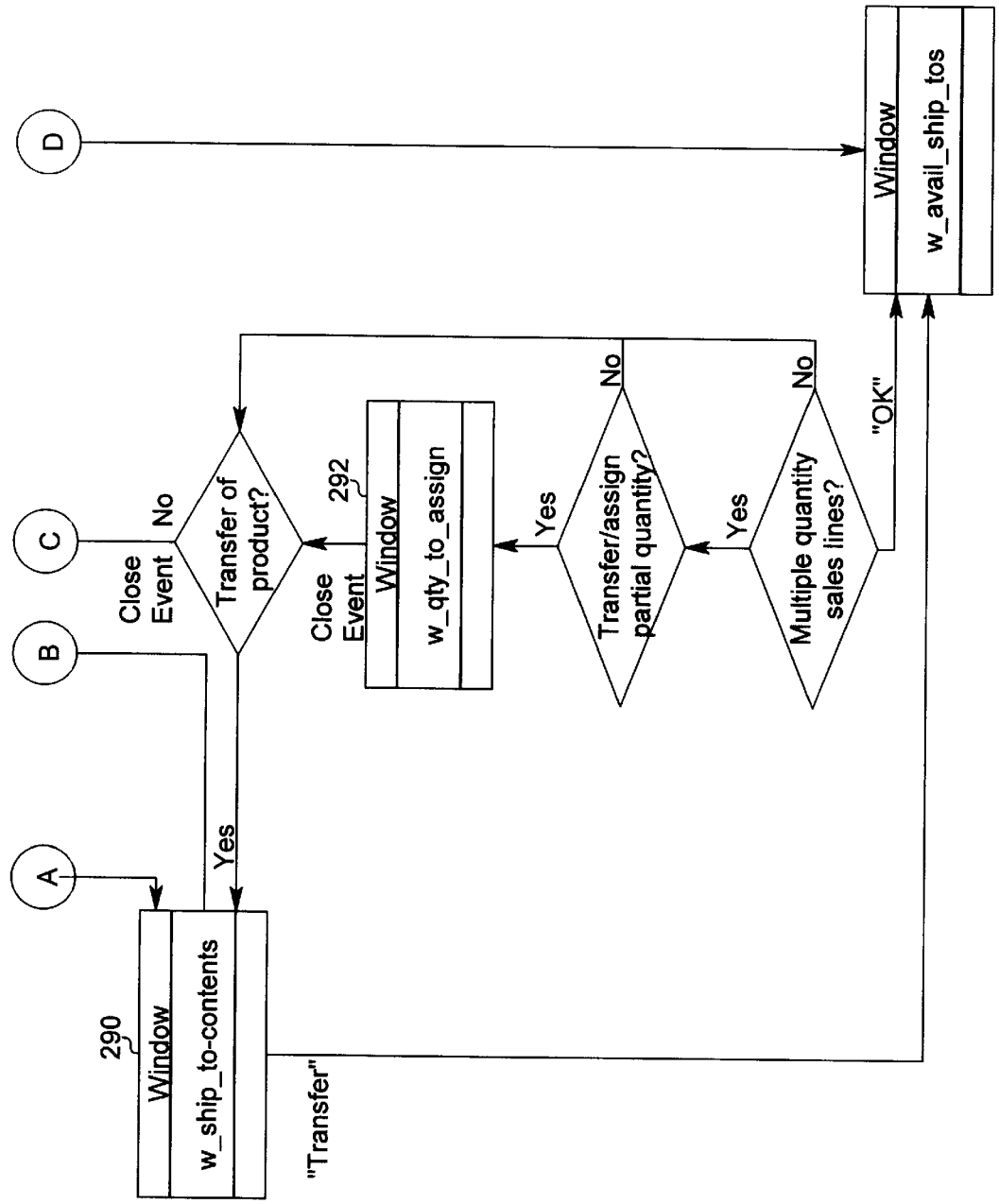

COMPUTERIZED SOURCE SEARCHING SYSTEM AND METHOD FOR USE IN AN ORDER ENTRY SYSTEM

This is a Divisional application Ser. No. 08/293,470, filed Aug. 19, 1994, now U.S. Pat. No. 5,592,378, which application(s) are incorporated herein by reference.

FIELD OF INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present invention relates to a computerized order entry system and method. The present invention is particularly useful in, but is not limited to, the telemarketing industry.

BACKGROUND OF THE INVENTION

Various types of structural complexes have been employed in the prior art by vendors of retailed products and services for storing products and for selling those products to consumers. Typically, the products are transported from the storage facility, such as a warehouse, to the store in which the products are sold. Consumers can purchase the products by going to the store during its business hours.

While this manner of selling products is commonplace, it has many disadvantages. One major disadvantage is cost. First, there are considerable start-up costs, such as the cost involved in furnishing the store. There is also the cost involved in maintaining the store. Typically, the vendor must not only provide the store itself, but also a parking lot capable of accommodating a reasonable number of vehicles of consumers who will visit the store. The rent on such a piece of property can be quite substantial, especially when the property is located in a major metropolitan area.

Due to the high costs of real estate, vendors are often forced to either locate their stores outside of metropolitan areas or to settle for smaller-sized facilities. In the former case, such locations are often less convenient for consumers. In the latter case, the vendor must sacrifice large product selection, thereby limiting the choice of products he or she may provide to the consumer.

Another problem associated with selling products through stores is theft. Vendors are forced to either absorb such losses or to install and maintain security systems, both of which further increase operating costs. Typically, these costs are passed on to the consumer through increased prices.

As a result of these disadvantages, it is becoming increasingly attractive to vendors to go directly to the consumer as a means to market their goods, such as through mail order, cable television, telemarketing and other direct response channels. There are many advantages to such direct marketing approaches. First, such channels are more convenient since they eliminate the need for the consumer to visit a store. The consumer need only fill out a form or pick up the phone to place his or her order. Second, such channels can be made available to the consumer 24 hours a day, seven days a week. Third, such channels have no geographic limits. These channels can be reached by the consumer from anywhere and everywhere.

To be truly effective, however, direct response channels must accommodate the taking and processing of orders in a fast, efficient and yet simple manner. In a typical telemarketing system, the time for an agent to process a customer's telephone call affects the overall performance of the system. For example, if the time for an agent to collect customer information is long, the business may have to employ more agents and subscribe to more telecommunications facilities (e.g., telephone lines) in order to be able to answer telephone calls from other customers in a timely manner. Moreover, if it takes the agent a substantial amount of time to place the order, the business may lose the customer.

The introduction of the computer has helped somewhat in this respect. Computerized shopping systems, however, are typically operated by users that are not computer-educated. As a result, the quality of the user interface is critical. The system must be designed to have a low learning curve.

The system must also be able to handle vast amounts of information. For example, when a customer places an order from a catalog, the agent typically keeps copies of recent catalogs and manually thumbs through them to look up and confirm the products requested by the customer. This procedure can be quite cumbersome. Moreover, since the customer is unable to see the physical product, it is critical to convey accurate product information to the customer.

The system also must be able to support changes due to functional modifications, enhancements and growth. The user interface typically used by computerized shopping systems, however, is embedded in the code of the program. As a result, the user is constrained by the system and not driven by the customer's needs and desires.

Accordingly, a need exists for a customer driven order entry system that permits placement of an order in a timely and efficient manner. There is also a need for an order entry system that provides for the normalization of data in order to limit redundancies of data, and for access to a variety of database management systems. There is a further need for an order entry system that supports enhanced marketing strategies and streamlined operations.

SUMMARY OF THE INVENTION

The present invention relates to a computerized source searching system and method for placing orders for offers that are located by searching through an electronic equivalent of the offer source used by the person placing the order.

In accordance with one embodiment of the invention, a computerized system for the placement of an order by a user for at least one offer is provided. The system includes a storage mechanism for storing offer information relating to the offers, and also for storing electronic reproductions of the offer sources. Each of the offer sources contains at least one offer. The system also includes source searching means for locating certain ones of the electronic reproductions of the offer sources. The source searching means includes a source display to display electronic offer source images, where the electronic offer source images represent identifying portions of the offer sources. The source searching means also includes a source filter to receive source search criteria, and for causing the source display to display those of the electronic offer source images that meet the source search criteria. The source searching means further includes a source selector to allow selection of an electronic offer source image. The computerized system includes offer searching means to locate the offer associated with the selected electronic offer source image. The offer searching means includes a source segment display to display particular electronic images of a portion of the offer source represented by the offer source image, and further includes an offer selector to allow the offer associated with the displayed electronic images to be selected by the user.

In another embodiment of the invention, a computerized method for the placement of an order for an offer is provided. The method includes the step of storing offer information relating to the offers, and also for storing electronic reproductions of the offer sources. Each of the offer sources contains at least one offer. The method includes the step of locating electronic reproductions of the offer sources, which in turn includes the steps of displaying electronic offer source images, entering source search criteria, displaying the electronic offer source images that meet the source criteria, and selecting an electronic offer source image that represents an identifying portion of the desired offer source. The method further includes the step of displaying electronic images of part of the offer source represented by the selected electronic offer source image, and selecting one of the offers associated with the selected electronic image.

These and other features and advantages of the present invention will become readily apparent to those skilled in the art from the following detailed description and corresponding drawings. As will be realized, the invention is capable of modification without departing from the invention. Accordingly, the drawings and description are to be regarded as illustrative in nature, and not as restrictive.

BRIEF DESCRIPTION OF THE DRAWINGS

As illustrated in the accompanying drawings in which like reference characters generally refer to the same parts or elements throughout the views.

DETAILED DESCRIPTION OF THE PREFERRED EMBODIMENTS

In the following detailed description of the preferred embodiments, reference is made to the accompanying drawings which form a part hereof and in which is shown by way of illustration of a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense and the scope of the present invention is defined by the appended claims.

Figure 1:
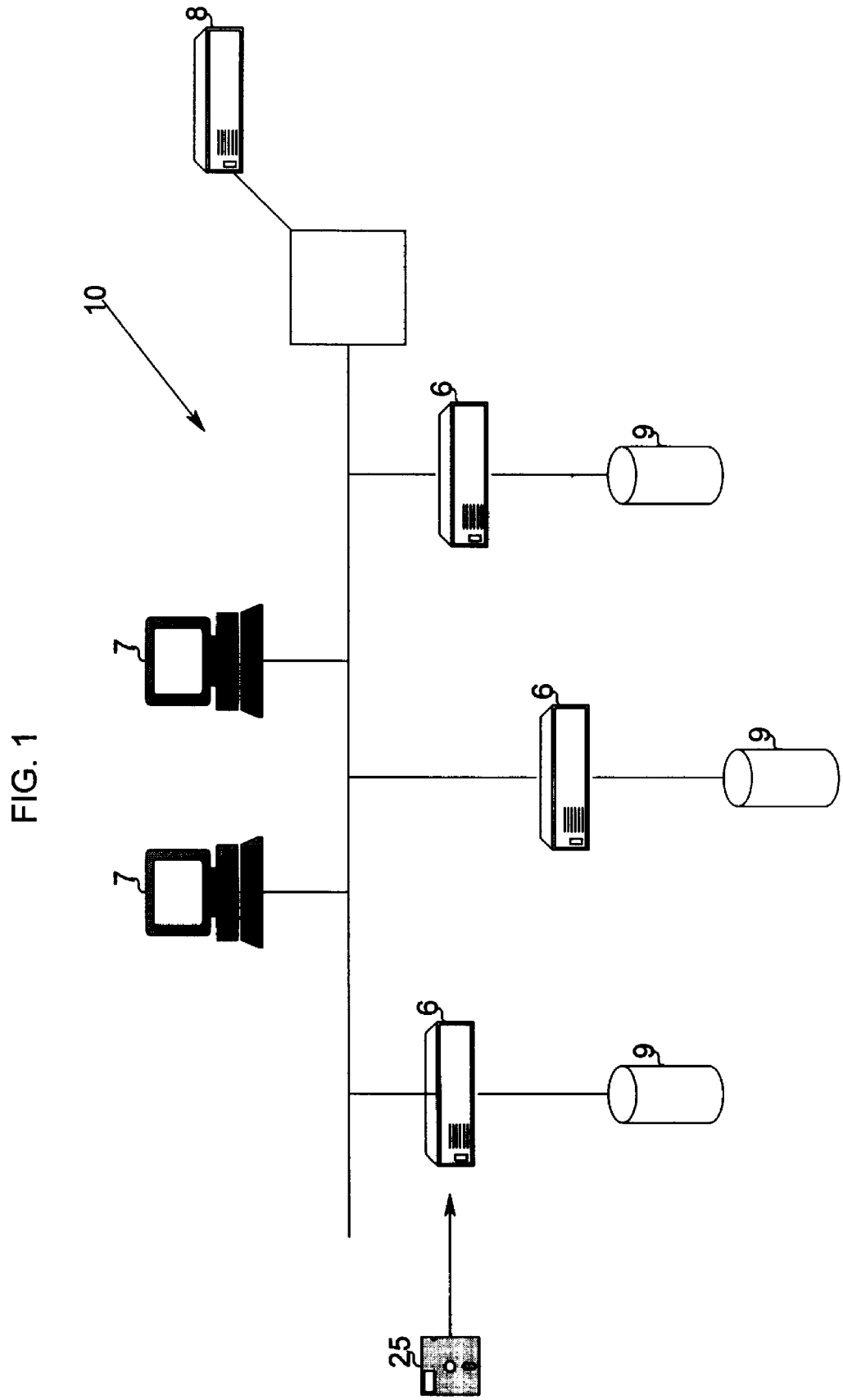
FIG. 1 is a perspective view of a computerized order entry system.

FIG. 1 illustrates an order entry system 10. The preferred network configuration of order entry system 10 includes a plurality of servers 6, data entry devices 7, back-end systems 8 and databases 9, and Program 25, which represents a computer program, or program code on a computer-readable memory for direction the actions of order entry system 10. Program 25 preferably resides in servers 6, but could alternatively reside in data entry 7. In a preferred form, servers 6 are Unix®-based, data entry devices 7 are personal computers running Microsoft® Windows software, back-end systems 8 include inventory control and distribution applications, and databases 9 are relational databases, such as Oracle® or Sybase®. The network configuration preferably supports the TCP/IP network protocol.

Data entry devices 7 can be any type of data entry device, such as computers, multimedia kiosks or interactive television. In addition, the number of servers 6 is not critical. However, in order to improve performance, system 10 preferably distributes data over multiple servers so as to minimize the contention on any single server. The architecture of the preferred system also supports high performance and high scalability by using database segmentation, data location transparency, and multi-threading strategies. Such an architecture is critical for rapidly expanding businesses with high seasonal peaks.

The preferred order entry system 10 uses traditional programming language with fourth generation language tools, both using object based mechanisms. Unlike process-driven languages, this type of language operates in an event-driven mode. The object based event driven nature of the application allows the system to map logic against the business rules that are processed when the user initiates an event (e.g. "clicking" on a button, exiting a specific data capture field, etc.).

In addition, system 10 preferably uses a graphical user interface (GUI) which provides an efficient interaction between the user and the system. GUI allows system 10 to react to each keystroke instead of having to wait for an entire screen to be filled. This allows the application to execute fewer instructions per interaction, and thereby respond to the user more quickly. This level of responsiveness both reduces errors and enhances user satisfaction. It also provides a customer driven flow whereby the flow is driven by customer requests, rather than system constraints.

Order entry system 10 is preferably an object oriented system. With object oriented systems, functions performed by the system are each represented by an object. An object is a software packet containing a collection of related data and methods for operating on that data. Each method is made available to other objects for the purpose of requesting services of that object. Each object includes a set of related sub-functions. Accordingly, each object is preferably arranged as a structured collection of sub-functions, while each function should be arranged as a structured collection of objects.

Inheritance is a feature of object-oriented systems through which a new object can absorb the properties of an existing object. As a result, new objects (e.g., functions) may be added with minimal changes to existing objects, thereby significantly reducing development time and maintaining a consistent user interface to the user. Maintenance is also easier through the use of inheritance. Inheritance also allows the use of common objects across applications. As a result, a system that is capable of evolving over time to meet changing needs can be achieved.

Figure 2:
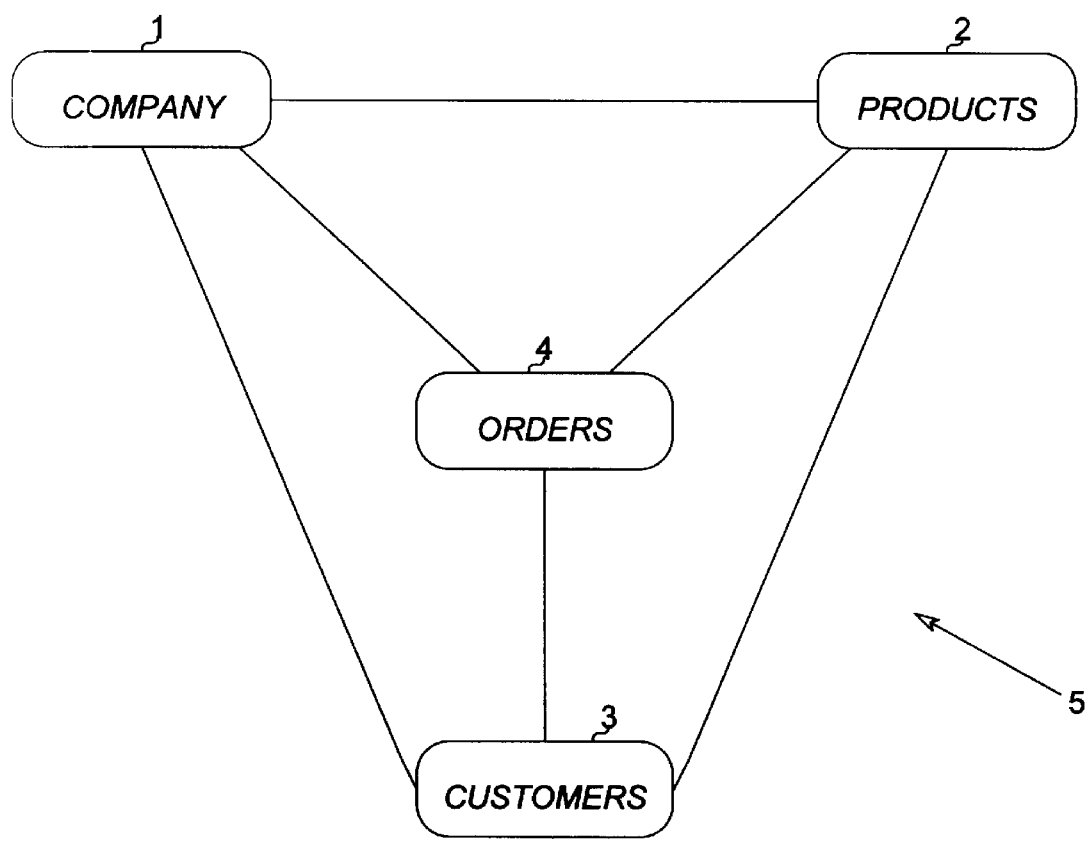
FIG. 2 is a business data model for the order entry system of FIG. 1.

FIG. 2 illustrates conceptually a preferred business data model 5 for order entry system 10 of FIG. 1. Business data model 5 identifies the major components of an organization'business and the relationship between those components. As can be seen in FIG. 2, the major components include a company 1, products 2, customers 3 and orders 4. Company 1 is the business entity that provides products and/or services for sale at a given price. Products 2 are those items that are produced and/or sold by the company and offered for sale to the customer at a given price. Customers 3 are those entities that wish to purchase the products from the company at a given price. Orders 4 are the vehicle by which the company can accurately record a sales transaction from the company to the customer for specific products at specific prices.

Figure 3:
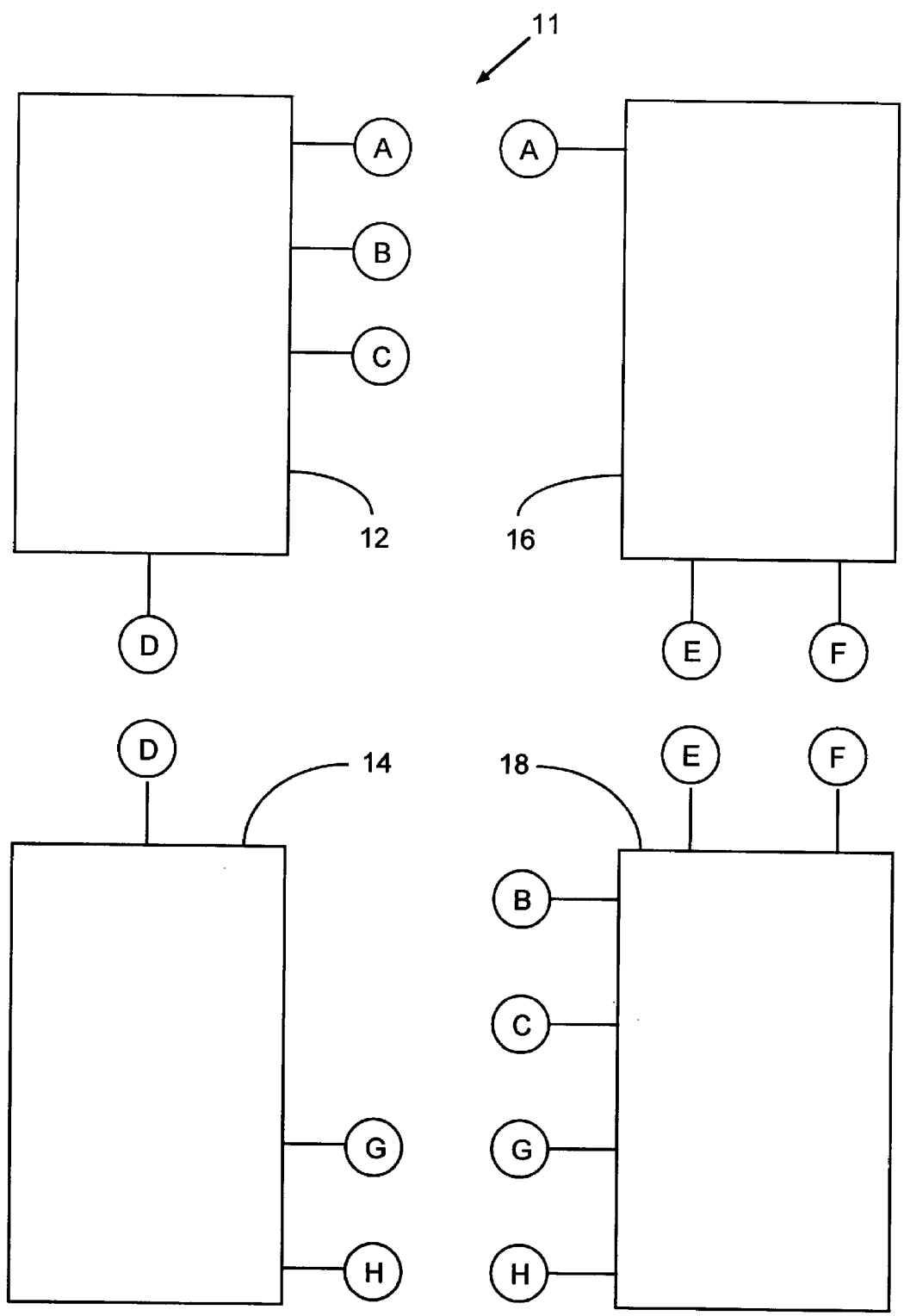
FIG. 3 is a preferred logical data model for the order entry system of FIG. 1.

The components identified in FIG. 2 are organized into logical groups that make up a logical data model. A data model is a lower-level model of the entities that are of interest to a business and the relationships between those entities. FIG. 3 shows a preferred logical data model 11 for order entry system.

The logical groups within logical data model 11 correspond to the components of business data model 5 of FIG. 2 and include a company structure 12, a product structure 14, a customer structure 16, and an order structure 18. Logical data model 11 is constructed in such a way as to support changes in relationships and data entities due to functional modifications or enhancements to order entry system 10.

For the purposes of discussion only, order entry system 10 will be described for the telemarketing industry in which a user of the system is taking an order over the phone from a customer for offers available through a catalog. It is to be understood, however, that this system may be applied to other entry devices, such as multimedia kiosks and interactive television. With such devices, the user and the customer may be one and the same person.

Figure 4A:
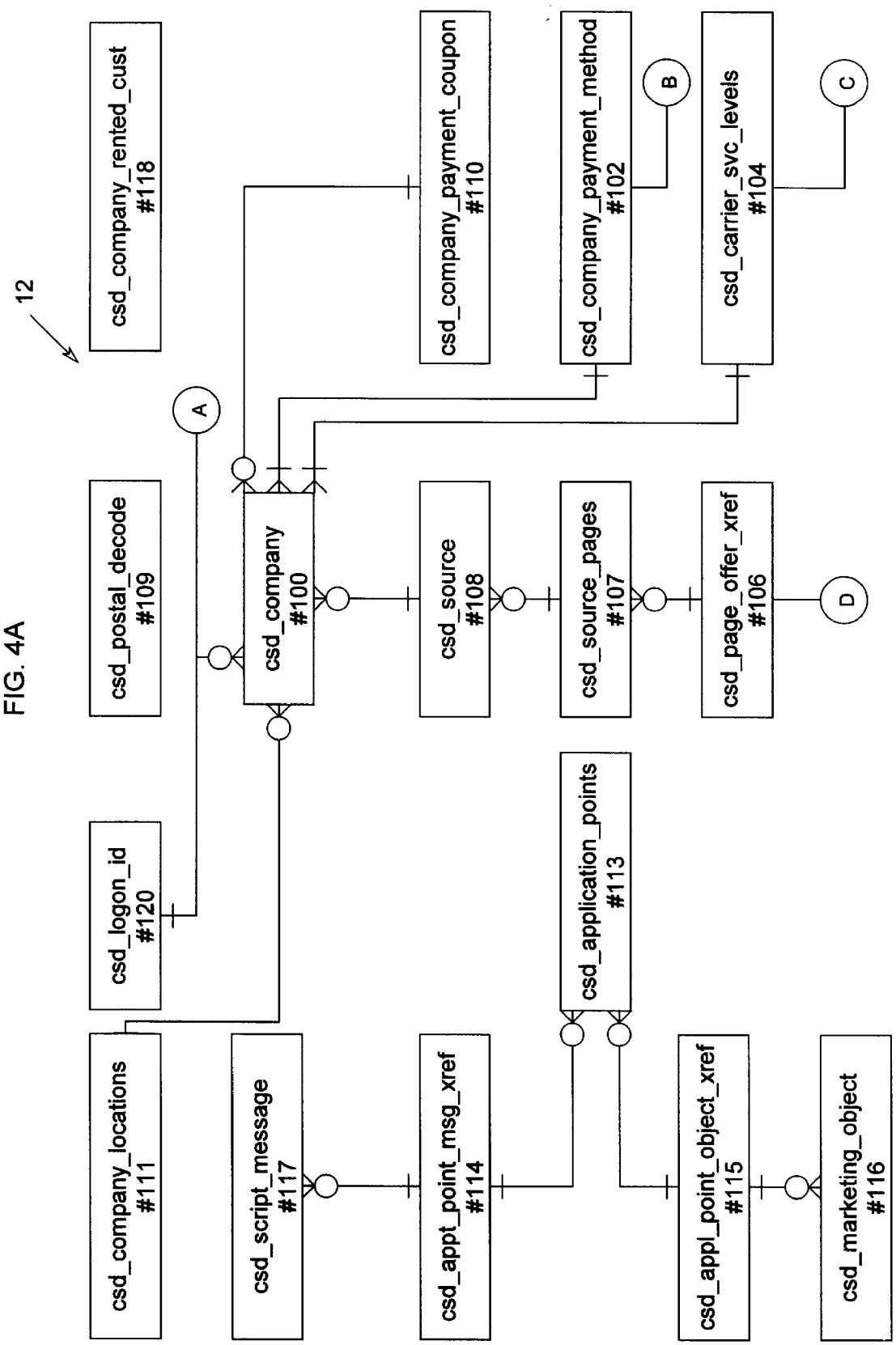
FIG. 4A is a preferred logical data model of the company structure of FIG. 3.
Figure 4B:
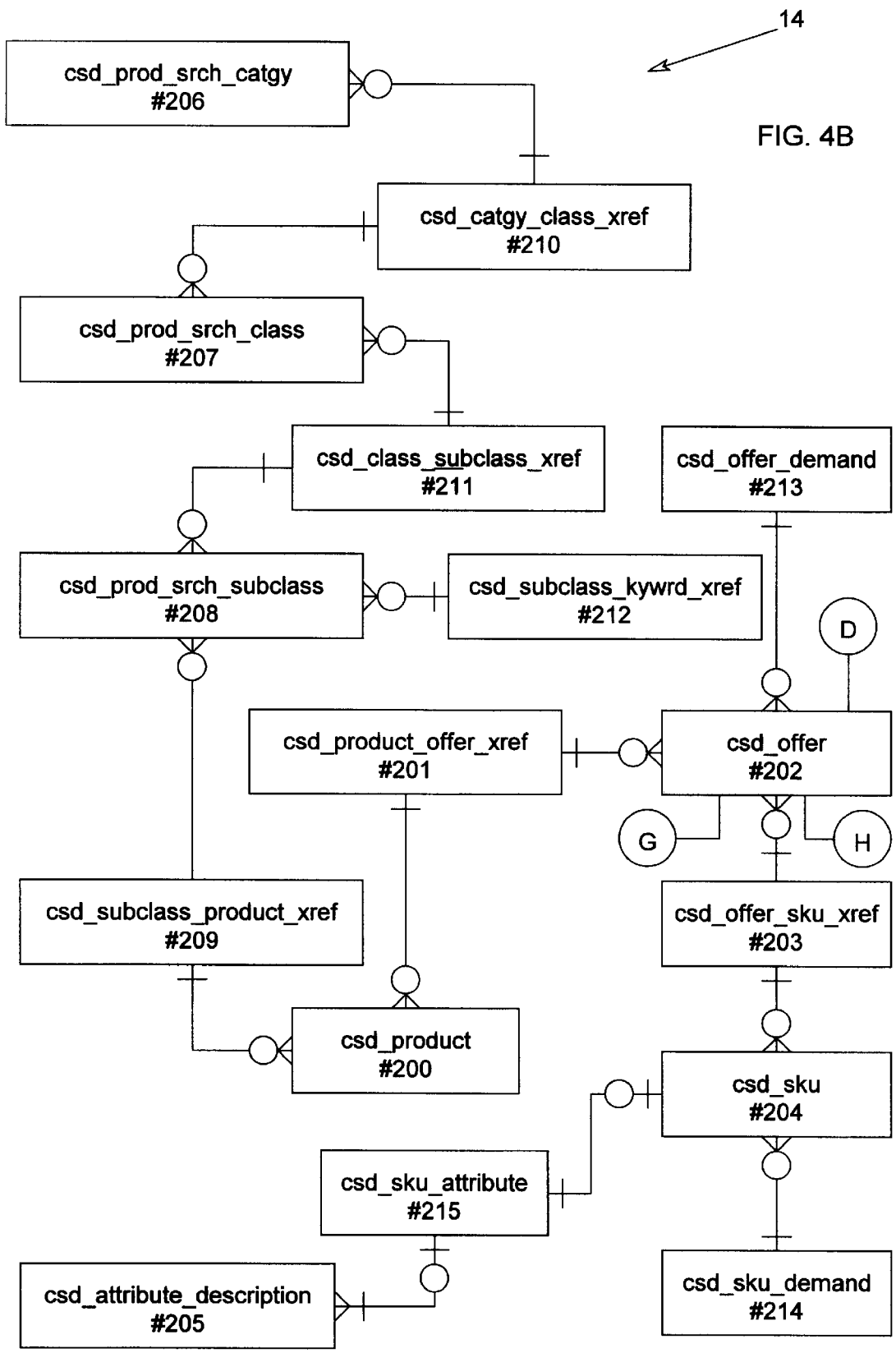
FIG. 4B is a preferred logical data model of the customer structure of FIG. 3.
Figure 4C:
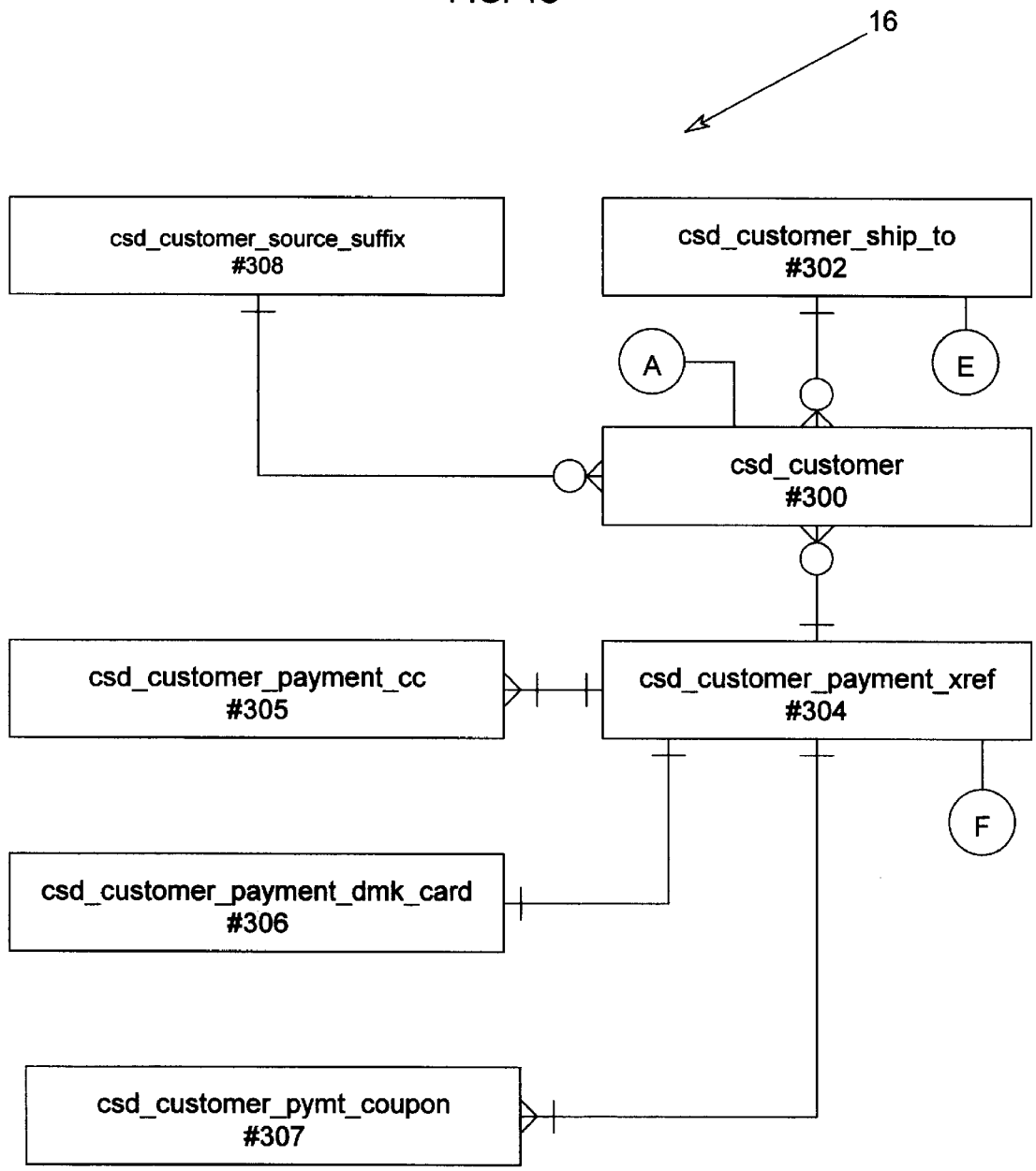
FIG. 4C is a preferred logical data model of the product structure of FIG. 3.
Figure 4D:
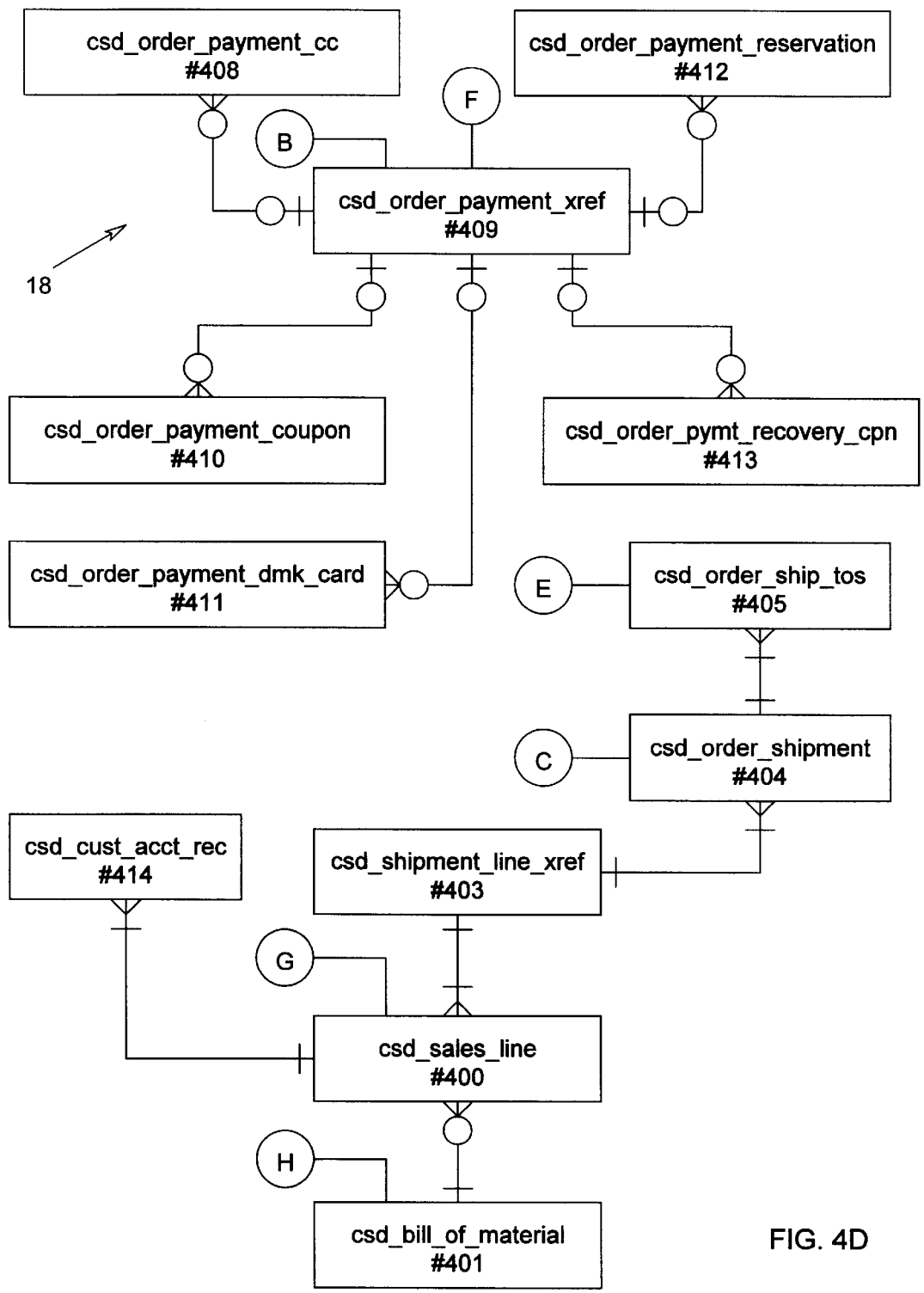
FIG. 4D is a preferred logical data model of the order structure of FIG. 3.

Each of the logical data models for the logical groups shown in FIG. 3 are further illustrated in FIGS. 4A through 4D. FIG. 4A shows the logical data model for company structure 12. FIG. 4B shows the logical data model for product structure 14. FIG. 4C shows the logical data model for customer structure 16. FIG. 4D shows the logical data model for order structure 18.

In the data flow diagrams shown in FIGS. 4A through 4D, the boxes represent entities that are associated with data tables in a database. The number in the box corresponds to the particular data table from which data related to that entity is stored and retrieved. Preferably, the same piece of information is not stored on more than one data table so as to eliminate data redundancy. With such a construction, several advantages are obtained, such as the reduction of errors, more consistent data, physical storage space savings, and the reduction of back-up storage requirements.

Figure 5A:
FIGS. 5A and 5B are an interconnected block diagram used to illustrate the meaning of the symbols in the data models of FIGS. 4A–4D.
Figure 5B:
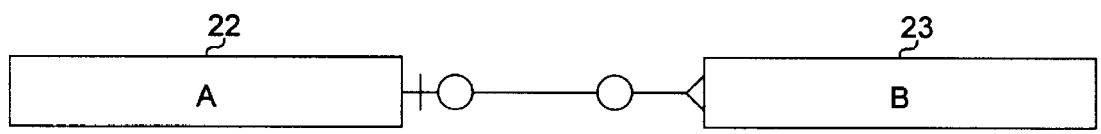

FIGS. 5A and 5B illustrate the meaning of the symbols used in the interconnections between the boxes of each of the logical data models shown in FIGS. 4A through 4D. As shown in FIG. 5A, for an element 20, there must be at least one element 21 and there may be many elements 21. Each element 21 may be linked to one and only one element 20. As shown in FIG. SB, there may be zero or many elements 23 for each element 22. Each element 22 may be linked to zero or one element 23. Each of the logical data models shown in FIGS. 4A through 4D will now be discussed below.

FIG. 4A illustrates the relationships of the data tables in company structure 12. Company structure 12 consists of entities whose attributes are linked to a company. It is made up of information such as a company identification number and company name, as well as system parameters relating to company-specific functionality. Also included in company structure 12 are entities that present company-specific options within the application, such as types of payment methods accepted by the company and the carriers available for customer shipments.

FIG. 4B illustrates the relationships of the data tables in product structure 14. Product structure 14 consists of entities whose attributes are linked to the products that are offered for sale. It includes data relating to a catalog or the source of the product information, as well as the product offers that may contain one or many product stock keeping units (SKUs). In addition to the product structure attributes, product structure 14 also contains information about product pricing and product availability.

FIG. 4C illustrates the relationships of the data tables in customer structure 16. Customer structure 16 consists of entities whose attributes are linked to a company's customers. Customer structure 16 includes data relating to a customer or a customer's previous contact with the company. A customer identification number and address information, as well as the customer's phone numbers and previous payment methods are included in customer structure 16.

FIG. 4D illustrates the relationships of the data tables in order structure 18. Order structure 18 consists of entities whose attributes are linked to an order for specific products offered by a company and sold to a customer. It includes data relating to a specific sales transaction. Order structure 18 is made up of information such as order line data, an order's shipment method or methods, billing information, and order-specific customization (e.g., monogramming).

From business data model 5 of FIG. 2, several business functions may be identified. The functions performed by order entry system 10 are grouped into modules that make up the functional business model 24 of FIG. 6. The preferred modules include a summary module 30, a name capture module 32, an order capture module 34, a billing module 36, and a shipping module 38. Each module contains a number of conversations, which are the vehicle used to maintain the data tables in the corresponding data model. Preferred conversations for each module are conveniently listed in the description of the drawings and explained later.

The user interacts with order entry system 10 through a user interface. A user interface is something which bridges the gap between a user who seeks to control a device and the software and/or hardware that actually controls that device. The user interface for a computer is typically a software program running on the computer's central processing unit which responds to certain user-entered commands. Order entry system 10 uses object-based windows as the preferred user interface. In a preferred form, PowerBuilder® by Powersoft Corporation is used as the window development tool.

Figure 7:
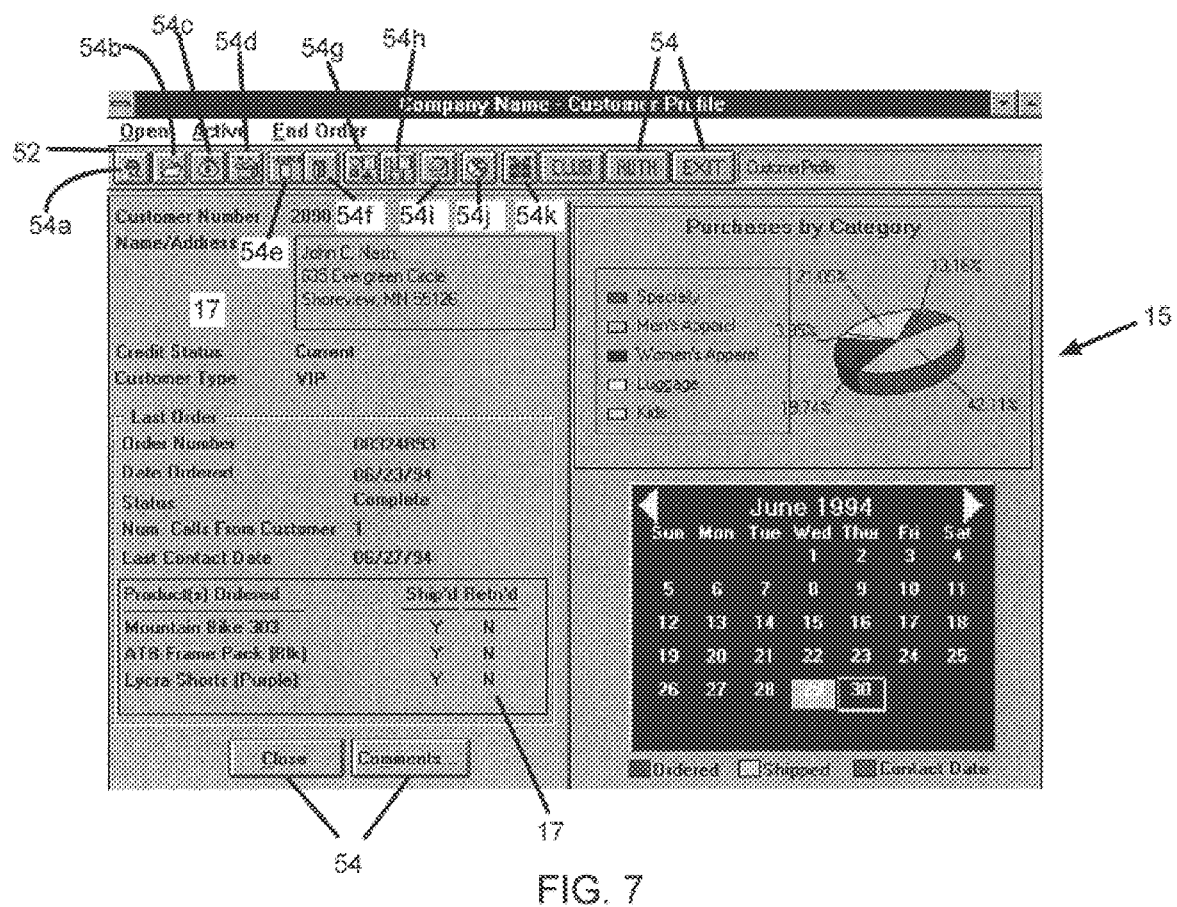
FIG. 7 is a preferred summary user interface for the order entry system of FIG. 1.

One preferred user interface is shown in FIG. 7. The user interface employs a window 15 preferably in the form of a rectangular shaped box having a toolbar 52 across the top which provides a set of standard menu options represented by a plurality of buttons 54a through 54k. Button 54a corresponds to a name capture function. Button 54b corresponds to a customer profile. Button 54c corresponds to a billing function. Button 54d corresponds to a shipping function. Button 54e corresponds to a source search function. Button 54f corresponds to a page search function. Button 54g corresponds to an offer lookup function. Button 54h corresponds to a manufacturer lookup function. Button 54i corresponds to a summary function. Button 54j corresponds to a discounts function. Button 54k corresponds to a gift card function.

Window 15 also includes a plurality of other buttons represented generally as 54. Buttons 54 typically represent an action or choice which is activated immediately upon user selection thereof. The buttons on window 15 may contain text, graphics or both. In a preferred form, buttons 54a through 54k contain graphics (i.e., icons) so that the user may readily determine the function they represent.

Window 15 preferably includes a plurality of data capture fields 17 for capturing data. The data capture fields allow the capture of variable length text. The data can be captured either automatically by system 10 or by the user, such as through a keyboard.

Each of the modules identified in FIG. 6 and their preferred conversations will now be discussed in detail below.

SUMMARY MODULE

Figure 6:
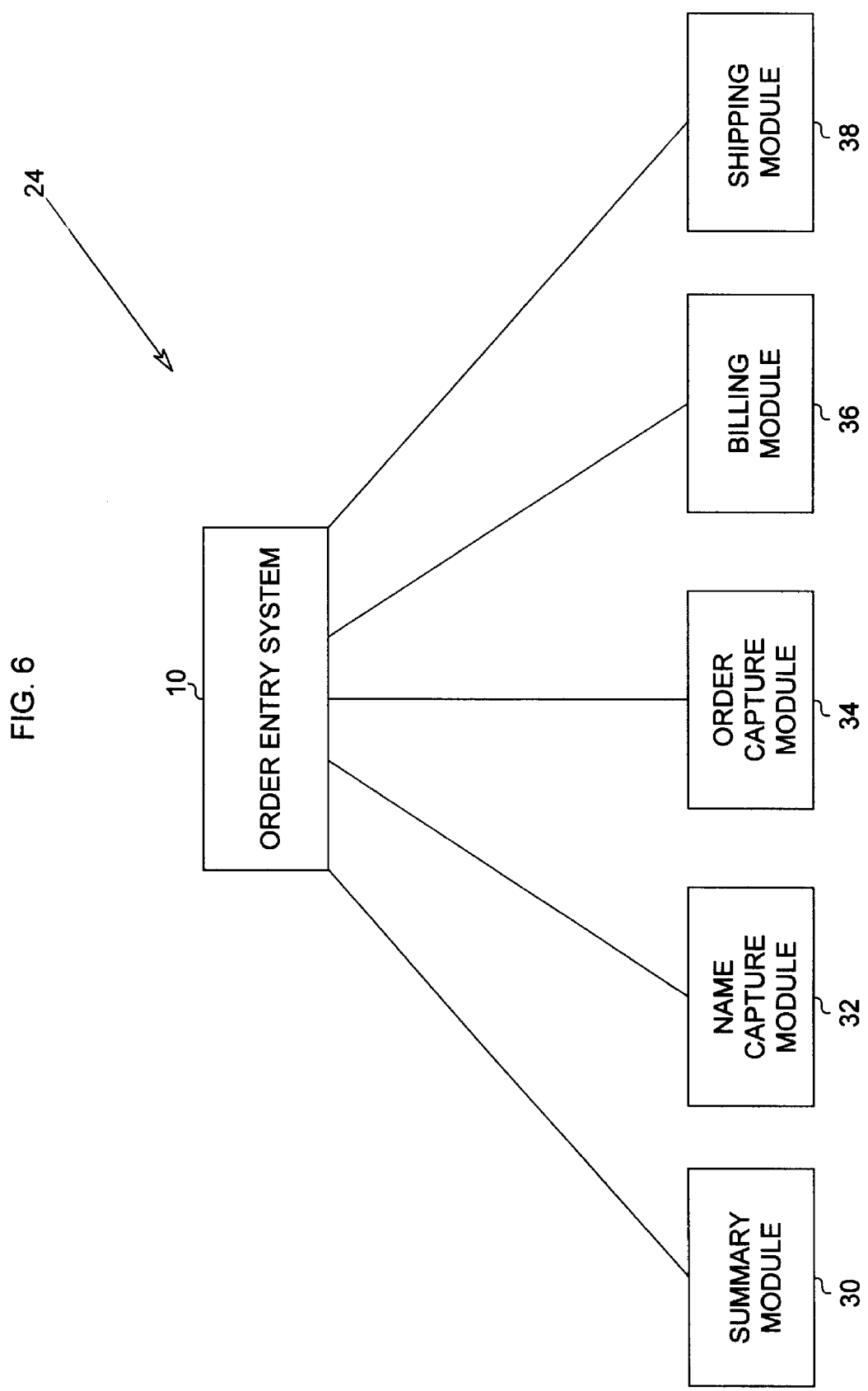
FIG. 6 is a conceptual block diagram of a functional data model of the order entry system of FIG. 1.
Figure 8:
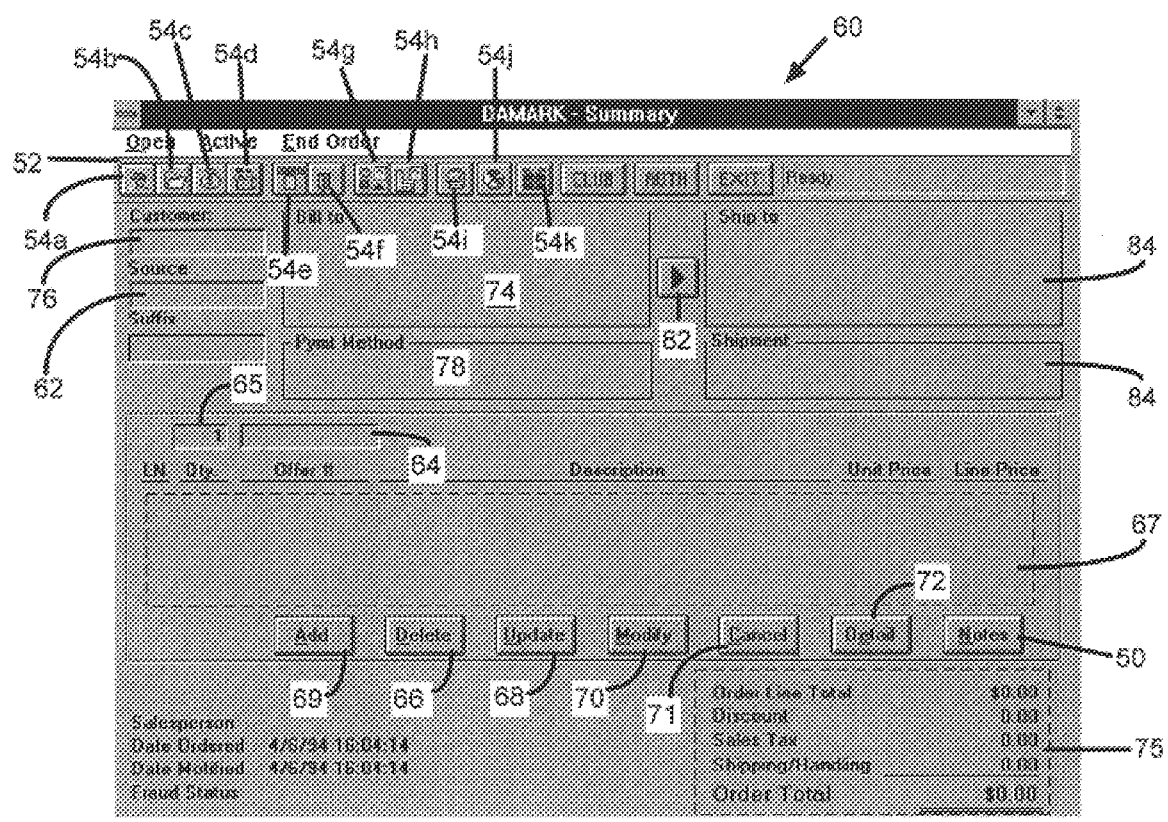
FIG. 8 is a preferred user interface for the summary module of FIG. 6.

Summary module 30 of FIG. 6 captures order information through window events and displays order information as it is completed. Summary module 30 is typically represented by summary window 60 as is shown in FIG. 8. The user may take an order via the toolbar 52 or by directly capturing information through the data capture fields on summary window 60 (i.e. the "fast path" method). The fast path method allows the user to enter an order when the customer possesses all of the necessary offer, billing and shipping information. It allows the user to perform all of the menu options represented by buttons 54a through 54k without having to activate each button separately. As a result, system 10 allows the user to navigate through all of the order entry functions associated with these buttons entirely from within summary window 60. Both methods of order taking, however, allow the taking of the order to be customer driven.

Figure 9:
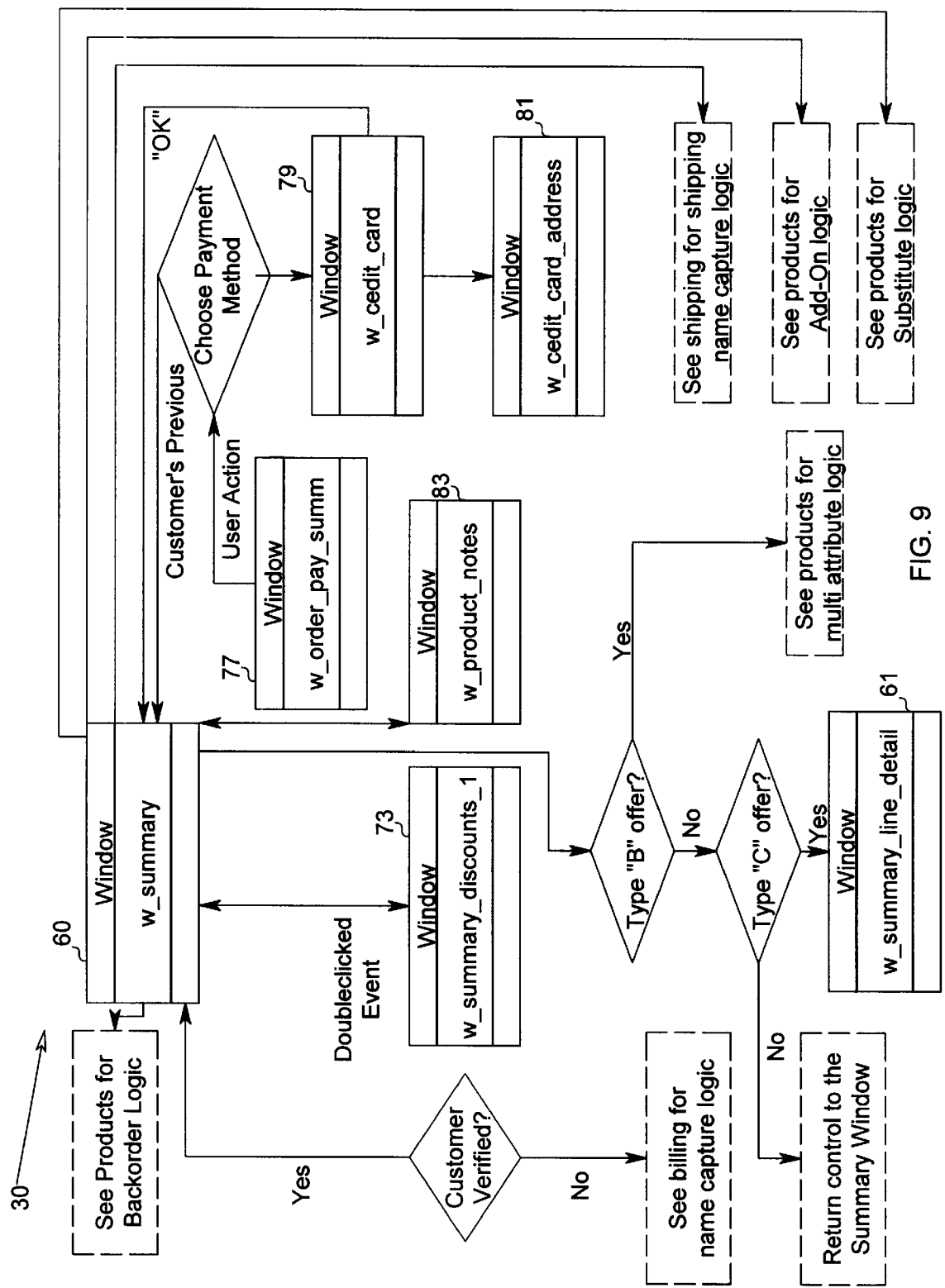
FIG. 9 is a preferred detailed dialog flow for the summary module of FIG. 6.

A detailed dialog flow for summary module 30 is shown in FIG. 9. With reference to FIGS. 8 and 9, the offer's source is entered in the source data capture field 62 of summary window 60. The source identifies in which catalog the customer found the offer. Upon capturing the offer number and offer quantity in the offer number data capture field 64 and quantity data capture field 65, respectively, an associated description, unit price and line price of the item is automatically displayed in data capture field 67 and inventory is automatically reserved.

Any of the offers listed in data capture field 67 may be added by selecting the add button 69. Offers may be deleted or quantities modified by selecting the delete button 66 and the update button 68, respectively. Offers having multiple attributes may be modified by selecting the modify button 70. Offers may be cancelled by selecting the cancel button 71. Offers that are comprised of other offers may be displayed via a popup/summary line detail window 61 by selecting the detail button 72. Window 61 lists offer information and the associated components of the offer, including a description of the component and the quantity of that component that is included in the order.

The billing address is preferably automatically captured at the bill to data capture field 74 when the user captures the customer number in the customer number data capture field 76. The preferred system verifies all customer numbers captured in customer data capture field 76 to determine whether they are a new, rented or existing customer.

A payment method may be captured when the user selects the payment method data capture field 78. Upon selection thereof, an order payment summary window 77 pops open where an existing payment method may be selected or a new payment method may be added. If a previous payment method is selected, the billing address is automatically captured into bill to data capture field 74. If a new payment method is selected, a credit card window 79 (see FIG. 14) pops open to capture the customer'credit information. Once the information is captured, a statement address window 81 may be opened to allow the user to verify the statement address. Financial billing information may be captured in data capture field 75.

The shipping address is captured into the ship to data capture field 80 by selecting the arrow button 82. Arrow button 82 also preferably automatically determines the best shipping carrier and service level for the offer being ordered by the customer. This determination is based, in part, on the shipment carriers and shipment service levels available, the offer being ordered and the shipment address. This feature is extremely important in light of the fact that point to point delivery providers are becoming more price competitive. The user, however, may override the system's determination if desired. This information, as well as the arrival date and shipping cost, are automatically displayed in the shipment data capture field 84.

Detailed information associated with a selected offer may be displayed via a product notes window 83 by selecting the notes button 50. Such information includes offer specifications and warranty information, for example.

A user may also preferably view all discounts that a customer receives for a particular order by selecting discounts button 54*j*. Upon selecting button 54*j*, a discounts window 73 opens. The information displayed by window 73 preferably includes the offer or offers being discounted, the type of discount, and the discount amount or amounts.

A user may also preferably view the customer's profile by selecting customer profile button 54*b*. Upon selection of button 54*b*, a customer profile window 15 as shown in FIG. 7 opens. The information displayed by window 73 preferably includes a textual and/or graphical representation of the customer's purchasing history, as well as a calendar for displaying the shipping status of any outstanding orders.

A user may also select a gift card by selecting gift card button 54*k*. Upon selection of gift card button 54*k*, a gift card window (not shown) opens, displaying at least one visual image depicting a representation of a gift card available through the system. In a preferred form, the gift card window displays a plurality of visual images depicting representations of a plurality of gift cards.

NAME CAPTURE MODULE

Figure 10:
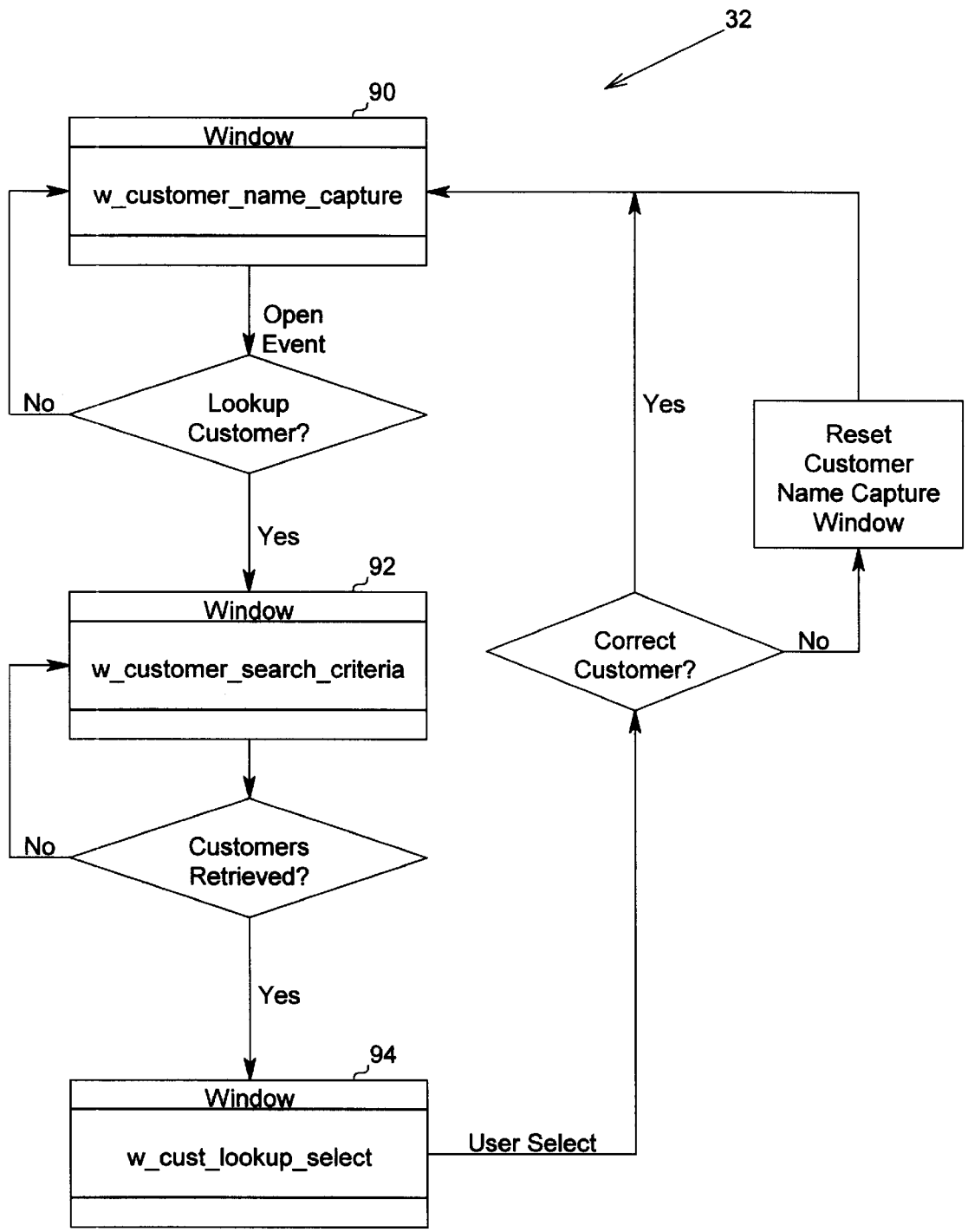
FIG. 10 is a preferred detail dialog flow for the name capture module of FIG. 6.
Figure 11:
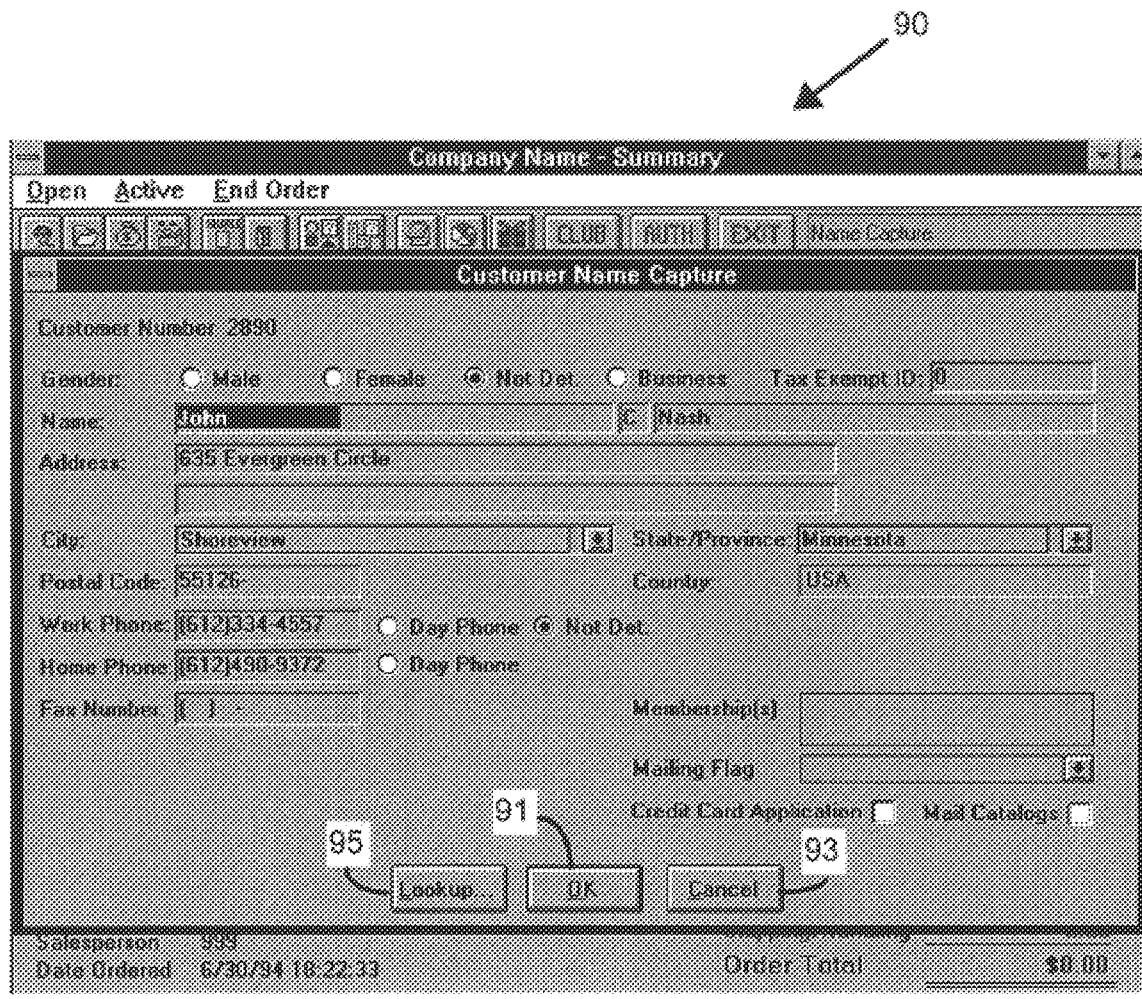
FIG. 11 is a preferred name capture user interface for the order capture module of FIG. 6.

Name capture module 32 of FIG. 6 is used to identify the billing customer. A detailed dialog flow for this module is shown in FIG. 10. The preferred user interface for the name capture module 32 is represented by a name capture window 90 as is shown in FIG. 11. Name capture window 90 can be accessed by selecting name capture button 54*a* from toolbar 52 of the user interface of FIG. 7. Name capture window 90 defines a plurality of data capture fields into which customer information may be captured. Such information may include the customer's number, name, address, phone number and gender, to name a few.

Referring to both FIGS. 10 and 11, name capture window 90 may include an OK button 91, a cancel button 93, and a lookup button 95. OK button 91 validates the captured information and assigns a customer number if one does not exist. Cancel button 93 closes name capture window 90. Lookup button 95 opens a customer search criteria window 92 and is used to search for an existing customer, as will be further explained below.

When a user's phone rings, the preferred order entry system automatically determines the customer who is calling and the business or residence from which they are calling by using Automatic Number Identification/Dialed Number Identification (ANI/DNI). The initial data that displays in window 90 preferably is based on an ANI match or non-match. If a single ANI match is made, the data capture fields of window 90 may be automatically filled with the customer's information. If a multiple ANI match exists (i.e., more than one customer is listed for a designated phone number) a window preferably pops opens and displays the names and addresses of all customers who match the ANI number. If found, the user can select the correct customer from the list, and the appropriate data capture fields in name capture window 90 are automatically filled with the customer'information.

If there is not an ANI match, name capture window 90 is empty, ready to accept customer information from the user. The user can either elect to enter the customer's information directly into the appropriate data capture fields or to search for the customer. If a search is requested, customer search criteria window 92 pops open. Upon opening, the user may enter any combination of search criteria, such as, for example, the customer's name, postal code, phone number (s) or the customer number. If no existing customers match the search criteria, the user is returned to name capture window 90 with the search criteria information automatically captured into the appropriate data capture fields. The user can then directly capture the remaining information needed to process the order.

If one or more existing customers match the search criteria, a customer lookup select window 94 pops open with all matching customers retrieved therein. From customer lookup select window 94, the user may verify whether one of the customers retrieved represents the correct customer. If so, the information may be automatically captured into the appropriate data capture fields of name capture window 90. If not, system 10 preferably fills in the data capture fields corresponding to the search criteria. The user may then capture the remaining needed customer's information.

While the customer's information has been shown to be captured within name capture module 32, it can be understood that such information can also be captured in other modules, such as billing module 36.

BILLING MODULE

Figure 12:
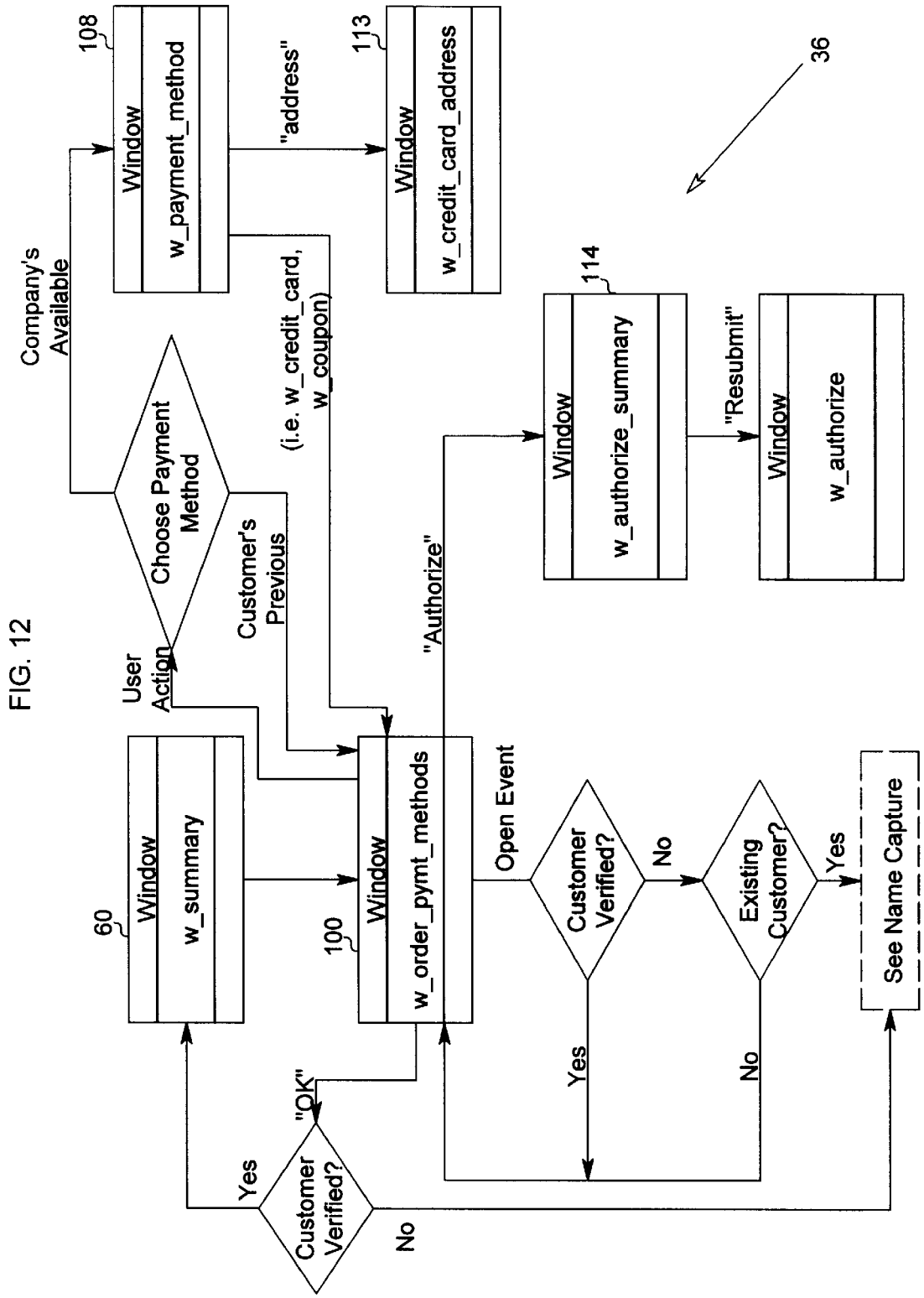
FIG. 12 is a preferred detail dialog flow for the billing module of FIG. 6.
Figure 13:
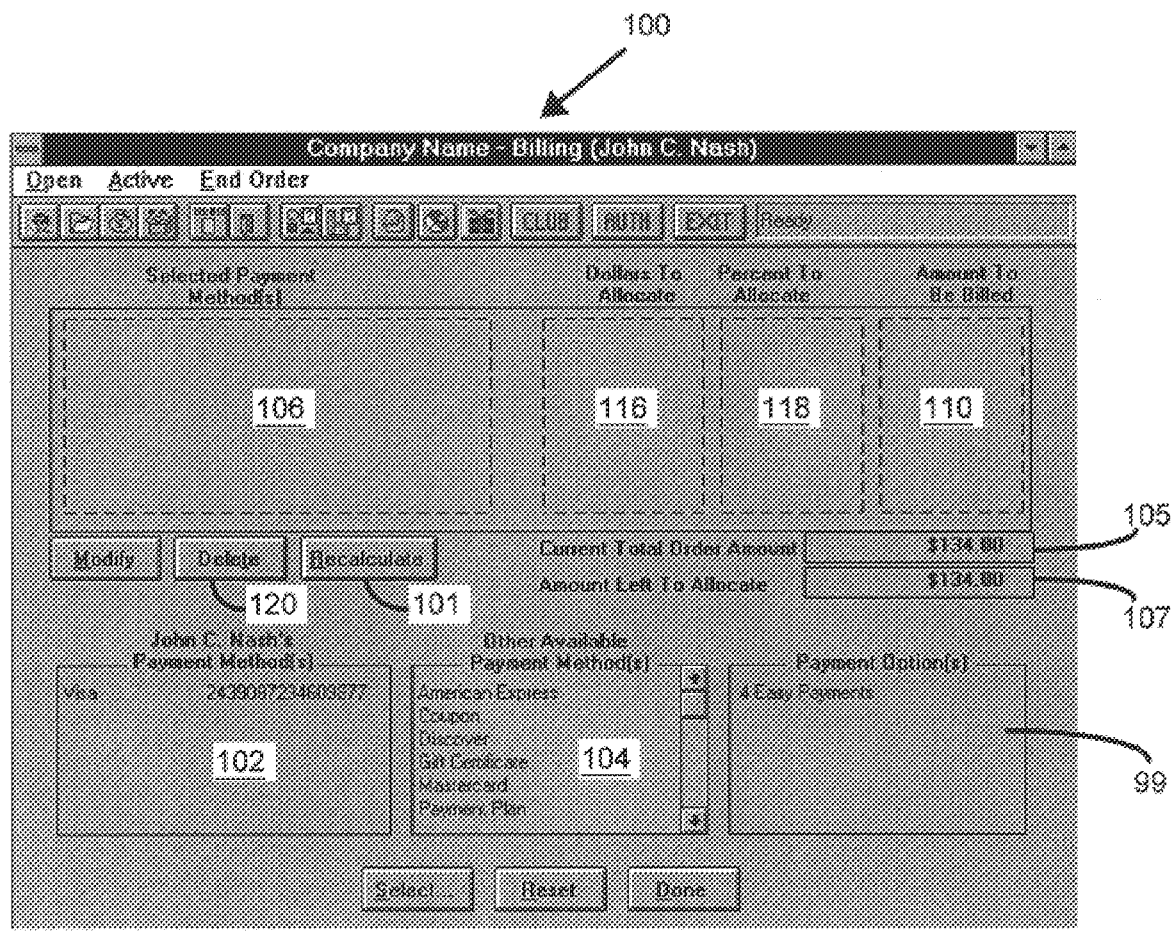
FIG. 13 is a preferred order payment user interface for the billing module of FIG. 6.

Billing module 36 is used to identify the payment method for the offer or offers being ordered by the customer. A detailed dialog flow for this module is shown in FIG. 12. Billing module 36 is typically represented by an order payment window 100, which is shown in FIG. 13. Order payment window 100 can be accessed by selecting the billing button 54*c* from toolbar 52 of the user interface shown in FIG. 7.

With reference to FIG. 13, order payment window 100 defines a customer payment method 102 in which the customer'previous payment methods may be displayed. For security reason, customer payment method data capture field preferably displays only proprietary in-house credit cards. The available payment methods for the company providing the offer or offers being ordered is displayed at available payment method data capture field 104. Such payment methods may include, for example, a credit card, a check, a coupon, and/or a recovery coupon (i.e., gift certificate). Order payment window 100 also displays any payment options at payment options data capture field 99. Examples of such payment options may include layaway, installments and the like.

Referring back to FIG. 12, from order payment window 100, the user may select either an existing payment method or a new payment method. If a new payment method is selected, a payment method window 108 pops open. Payment method window 108 will change dynamically depending on which payment method type is selected (i.e., credit card window, coupon window, etc.). If payment method window 108 is opened as an existing payment method, the data capture fields defined therein are automatically filled in with the customer's payment history.

Upon selection of one of the payment methods, this history is automatically captured into selected payment method data capture field 106. By eliminating manual re-entry of such information, errors in billing are reduced. A small visual image representation of the payment method is preferably included for each payment method listed in payment method data capture field 106 for easy verification that the selected payment method is correct. In this manner, errors in billing may be further reduced. If payment method window 108 is opened as a new payment method, the user must capture the payment information in the appropriate data capture fields.

Figure 14:
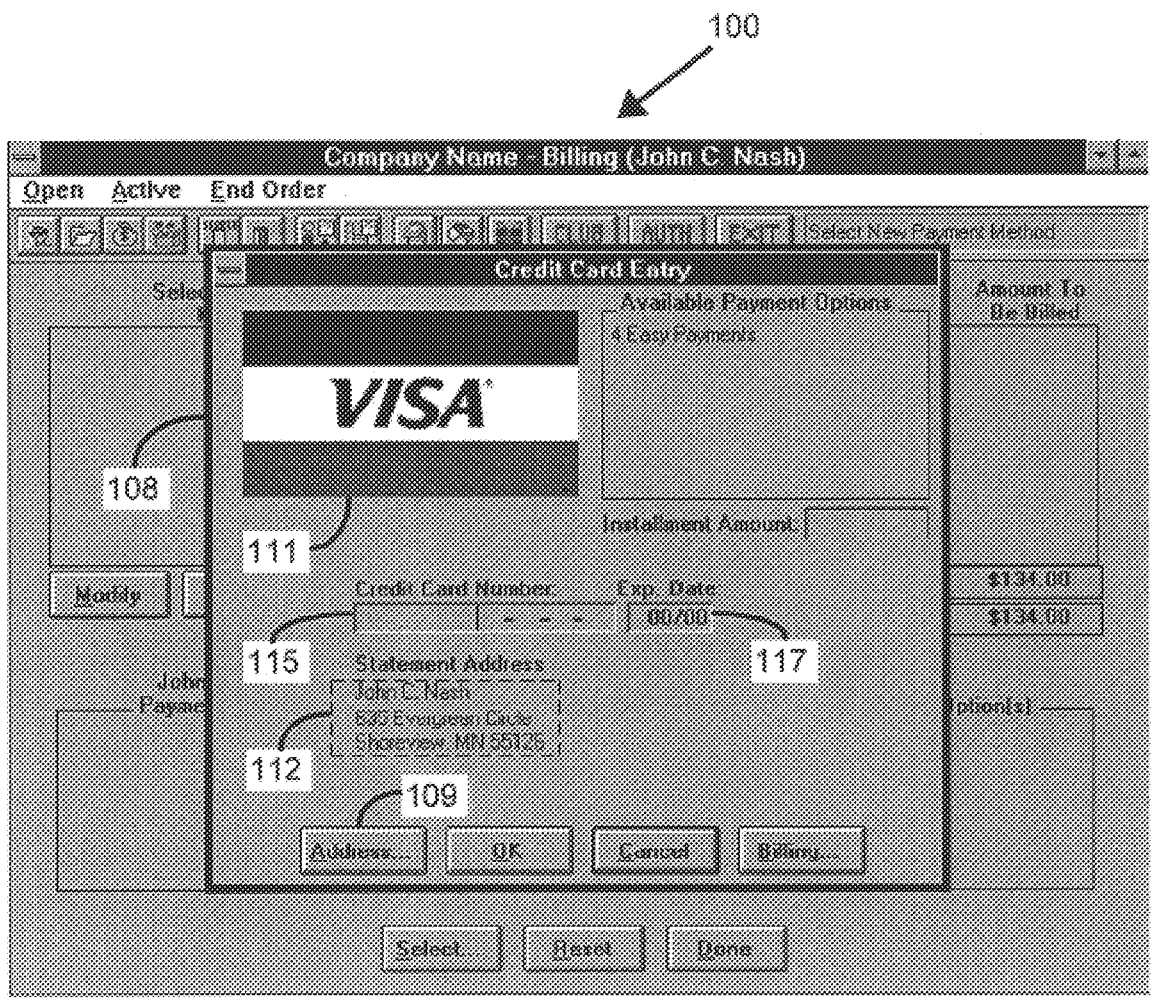
FIG. 14 is a preferred credit card entry user interface for the order entry system of FIG. 1.

An example of a payment method window 108 for a credit card payment is shown in FIG. 14. Payment method window 108 of FIG. 14 defines a credit card number data capture field 115 and expiration date data capture field 117 into which the customer' credit card number and expiration date, respectively, may be captured. This window also preferably includes a visual image 111 of the selected credit card. This allows the user to easily verify the credit card being used by the customer and further helps to prevent errors in billing. The customer's billing statement address is captured at statement address data capture field 112. In a preferred form, the customer's statement address will default to the address captured in bill to data capture field 74 of name capture window 90.

The statement address captured in statement address data capture field 112 may be verified via a credit card address window 113 by selecting the address button 109 from payment method window 108 of FIG. 14. The billing statement address, however, should not be changed by the user unless the customer has moved. If the billing statement address is different from the address given verbally by the customer, it may be a sign of credit card fraud. Therefore, if the user changes a billing statement address for an existing credit card, the preferred system will set a fraud status flag so that follow-up work can be performed to verify that the credit card was not stolen.

Once all of the information for the selected payment method has been captured, the user is returned to order payment window 100 with the selected payment method information automatically captured in selected payment method data capture field 106. From there, the user may select to perform an electronic credit card authorization via an authorize window 114. Once authorized, this payment method will be assigned to the order. In addition, if the payment is new, this payment method information will be captured into customer payment method data capture field 102.

One of the key features of billing module 36 is the ability to allocate an order total across a plurality of payment methods. Any combination of the customer's previously used payment methods, or new payment method or methods may be assigned to an order as long as at least one payment method is selected. As is shown in FIG. 13, the customer may allocate either a dollar amount or a percent of the total order amount to each payment method, with the exception of coupons and gift certificates that state a specific dollar off amount. The dollar amount allocation is captured in dollar amount data capture field 116, while the percent to allocate is captured in percent data capture field 118. The amount to be billed is automatically calculated by the preferred order entry system and captured in the amount to be billed data capture field 110. The total order amount is automatically calculated and captured in total order amount data capture field 105, while the amount left to allocate is automatically calculated and captured in amount left to allocate data capture field 107.

If a single payment method is chosen, one hundred percent (100%) of the order total is automatically allocated to that payment method. If more than one payment method is selected, the customer must choose how to allocate their payment methods. A recalculate button 101 is provided on billing window 100 which, when selected, calculates the dollar amount to be billed to each payment method based on the dollar amounts and percentages captured for each payment method. If the allocation is incomplete, the total amount of the order will be applied to the first payment method, less any coupon or gift certificate.

The allocation is preferably calculated in the following manner. First, each order payment method line is evaluated with the first payment method. Second, the percent-to-allocate for all rows is summed. This value normally must equal either one hundred percent (100 %) or zero percent (0%) (zero percent meaning that the order amount is fully allocated by dollar amount). If it does not, the user must either re-enter the allocation percent so that it equals one hundred percent (100%) or fully allocate the dollar amount of the order. When the first payment method is added to the order, the percent data capture field 118 preferably is automatically set to one hundred percent (100%) and will remain that way unless modified by the user. Third, the actual allocation calculations are performed. To begin with, all dollar amounts are allocated to each respective payment method. The allocation routine will allocate up to the current total order amount. If the dollar amount to allocate is greater than the total order amount, each row will be allocated beginning with the first row until the amount left to allocate is zero dollars ($0). The payment methods will not be over-allocated. If the total order amount is not completely allocated by dollar amount, the remaining amount to be allocated is calculated and allocated according to the percentages entered.

Other functions provided through order payment window 100 include deleting a selected payment method from the current order. A customer may wish to remove a selected payment method if they change their mind or if it is incorrect, such as if his or her credit card has expired. These functions may be accomplished via a delete button 120.

Upon closing order payment window 100, if the order is not completely allocated, the preferred order entry system will prompt the user to finish allocating the payment methods. In addition, if the customer has not yet been verified at this point, name capture window 90 will pop open to capture the customer's billing-related information.

Figure 15:
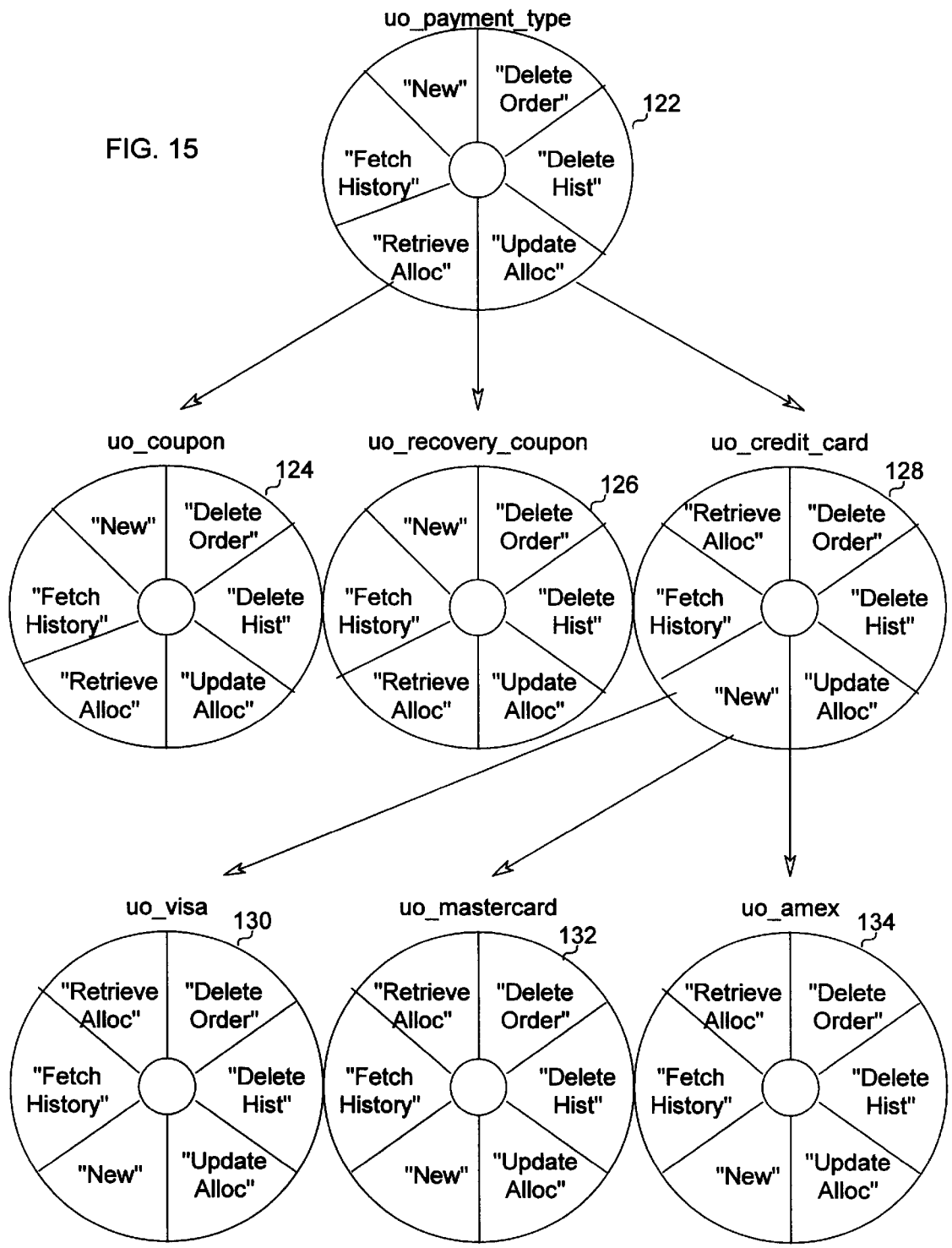
FIG. 15 is a preferred object inheritance structure for a payment object for the order capture module of FIG. 6.

FIG. 15 displays a preferred object inheritance structure for some preferred objects associated with billing module 36. These objects include a payment type object 122, a coupon object 124, a recovery coupon object 126, a credit card object 128, a Visa® credit card object 130, Mastercard® credit card object 132, and an American Express® credit card object 134. Each object defines a set of related functions for operating on payment method-related information. The preferred functions for the objects associated with billing module 36 include adding a new payment type, fetching the history of an existing payment type, deleting a selected payment method, deleting an order, retrieving the allocated dollar amounts and percentages based on the allocations selected by the customer, and updating those allocations.

All of the functions defined by the object, however, are not necessarily needed for each object type. For example, no history information exists for payment with a coupon. The "fetch history" and "delete history" functions of coupon object 124 are therefore, preferably inactive, as is illustrated by the non-highlighted nature of these functions on coupon object 124. All of the other functions of coupon object 124 are applicable and are thus, preferably highlighted.

Figure 16:
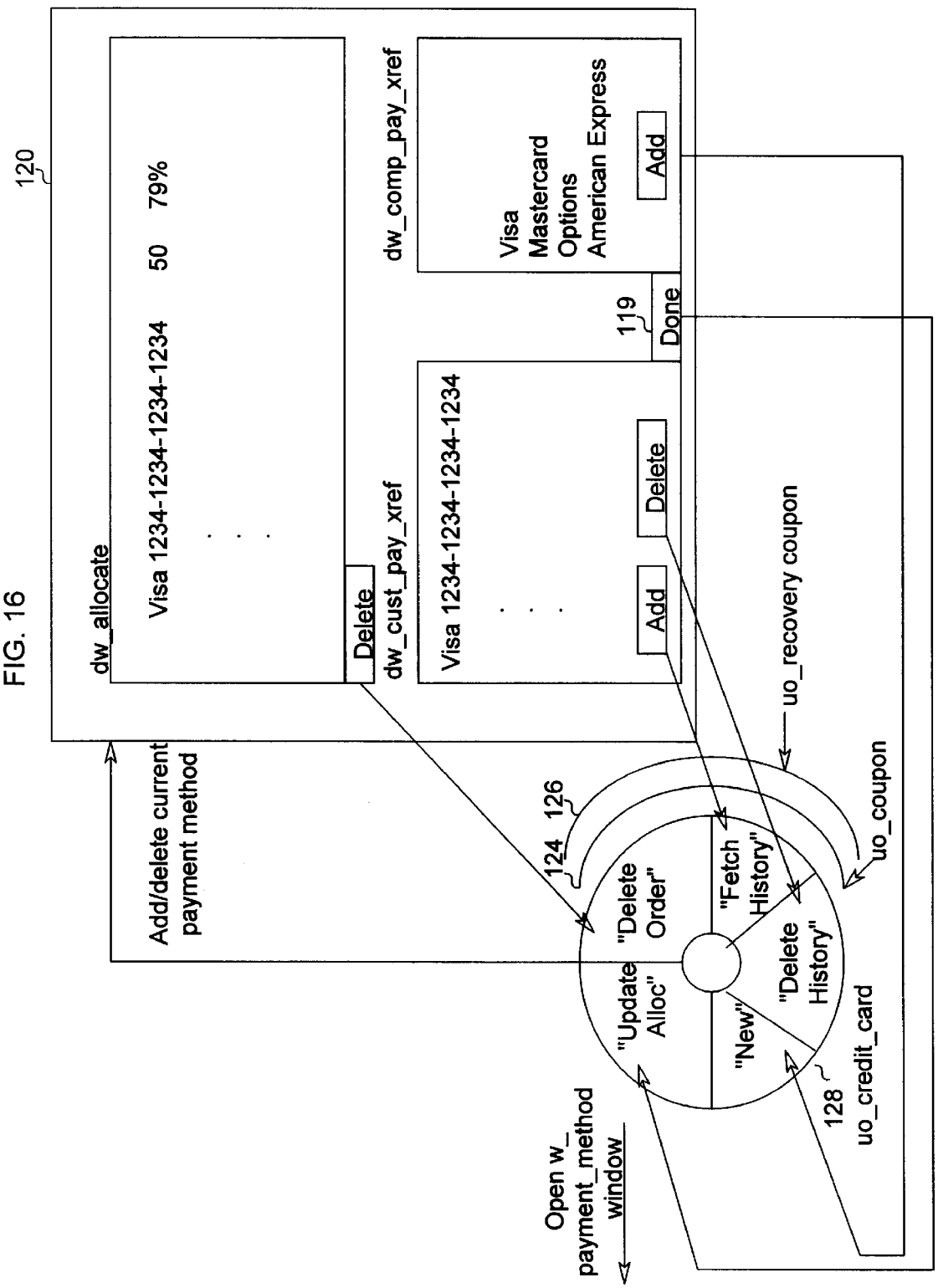
FIG. 16 is a preferred detailed window data flow for a user interface of the billing module of FIG. 6.

FIG. 16 represents a detailed window data flow for billing module 36. In particular, FIG. 16 shows the interaction between an allocate window 120 and credit card object 128, coupon object 124, and Recovery coupon 126 of FIG. 15. For example, if the user is done allocating the payment methods for the order, upon selecting the done button 119 from window 120, system 10 is directed to the update allocate function of the appropriate objects.

ORDER CAPTURE MODULE

Figure 17A:
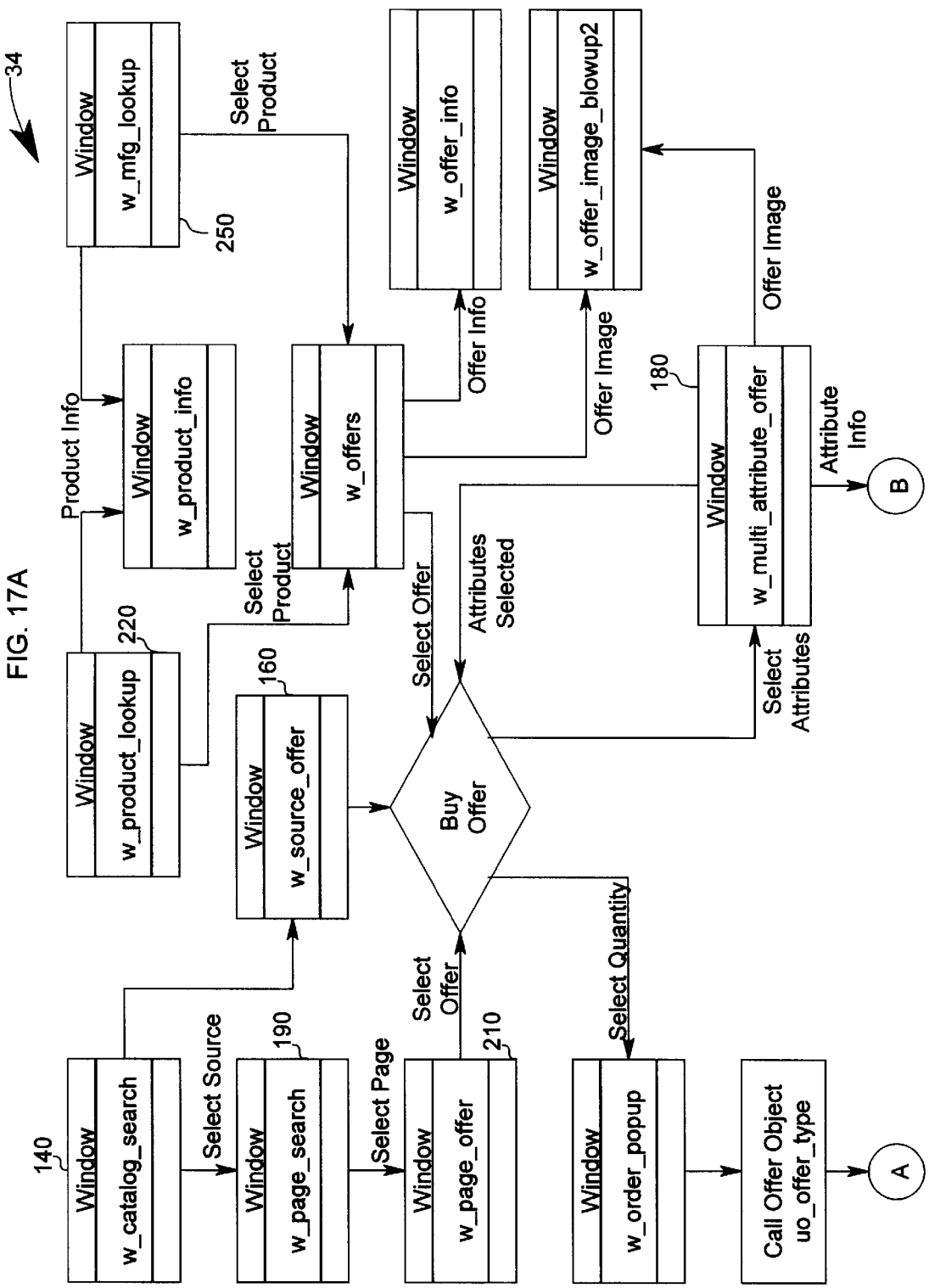
FIG. 17 is a preferred detail dialog flow for the order capture module of FIG. 6.
Figure 17B:
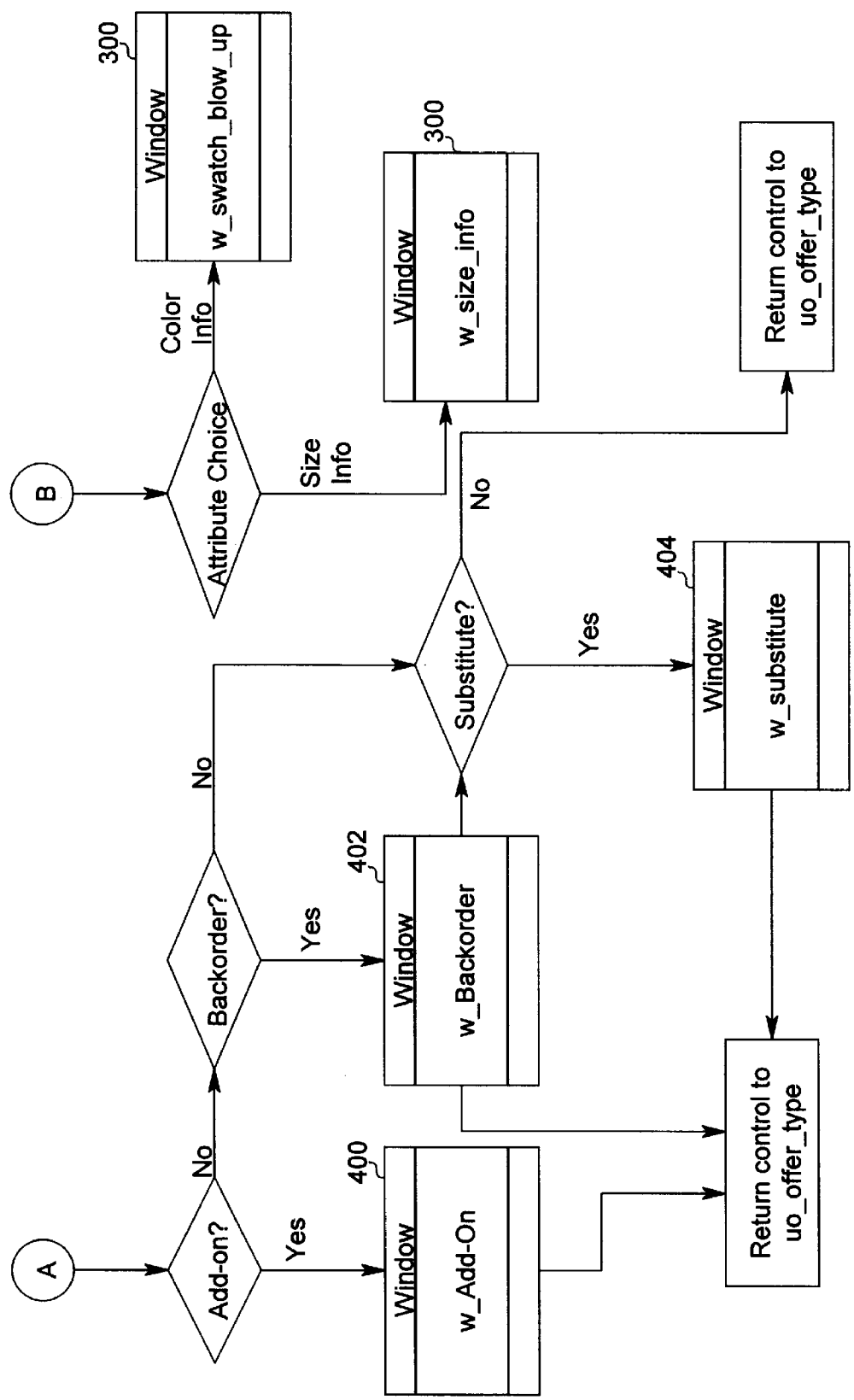

Order Capture module 34 identifies the way in which a user may capture an order for an offer from a customer. A detailed dialog flow for the order capture module 34 is shown in FIG. 17. In order to capture an order, the user must be able to pull up the offer from the system. In this regard, order capture module 34 is made up of four functions, namely source searching, page searching, offer lookup, and manufacturer lookup. These functions may be represented on toolbar 52 of the user interface of FIG. 7 by source search button 54e, page search button 54f, order lookup button 54g, and manufacturer lookup button 54h. Each of these functions will now be described in detail below.

Figure 18:
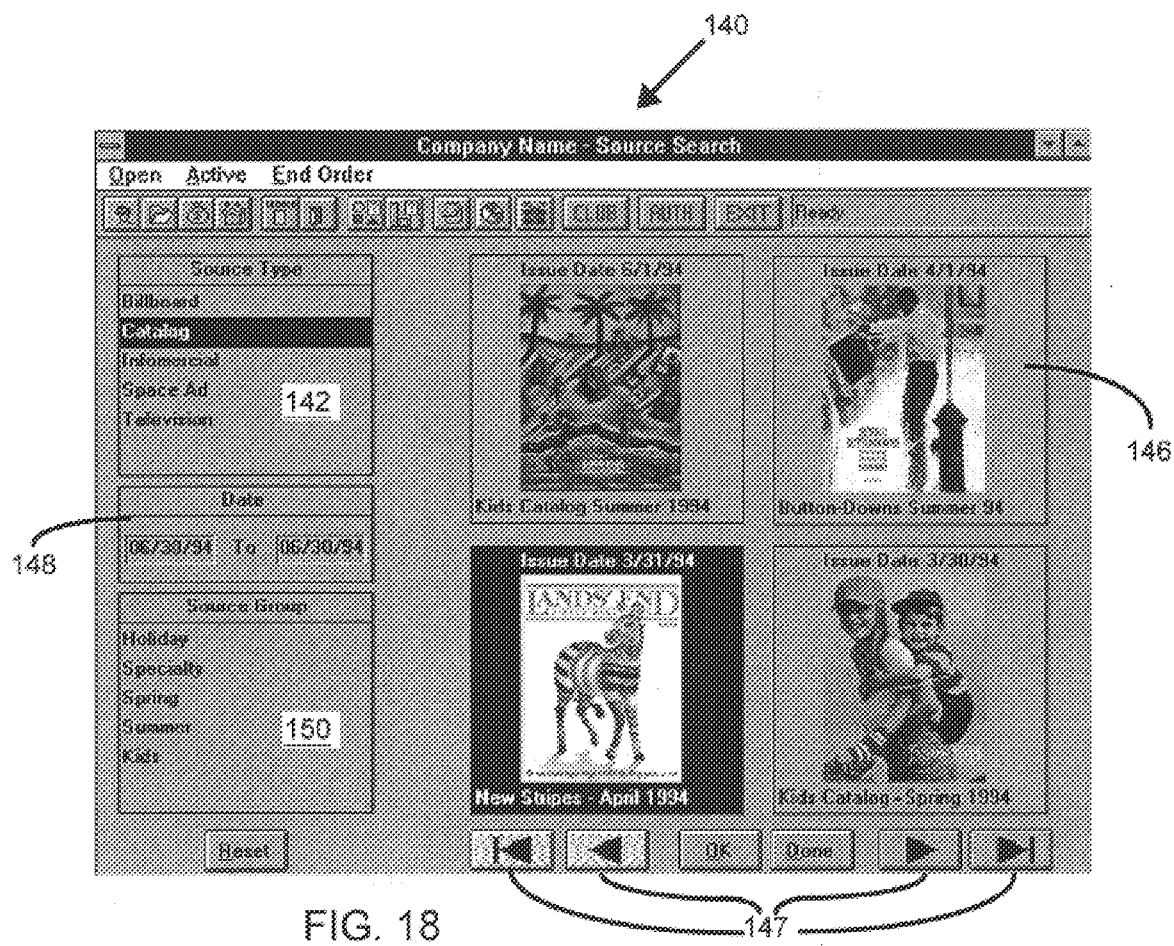
FIG. 18 is a preferred source search user interface for the order capture module of FIG. 6.

Upon activation of source search button 54e, a source search window 140 as shown in FIG. 18 pops open and permits the user to select the source in which the offer being ordered is located. Source search window 140 defines source search criteria data capture fields for capturing a search criteria from the user. As is shown from source search window 140 of FIG. 18, three search criteria data capture fields are preferably identified. These include a source type search criteria data capture field 142, a source date search criteria data capture field 148 and a source group search criteria data capture field 150.

Source type search criteria data capture field 142 identifies all of the source types used by a particular business to expose their product line. Such source types may include catalogs, magazines, billboards, infomercials and the like. It is understood that the search criteria will vary depending upon the source type selected. Upon selecting a source type, window 140 displays at least one visual image 146 depicting a representation of a source associated with the source type currently selected. For example, in the case of catalogs, image 146 preferably represents a cover page. In a preferred form, a plurality of visual images 146 as shown in FIG. 18 are provided. The number of visual images 146 displayed, however, is not critical.

Source search window 140 also identifies date search criteria data capture field 148 and source group search criteria data capture field 150. In the preferred system, after a source type has been selected, the user can further filter or expand the list of sources by changing the source date captured in source date search criteria data capture field 148 and/or selecting a source group from source group search criteria data capture field 150.

Buttons 147 are preferably provided for allowing the user to scroll through the sources one at a time, preferably in an ascending or descending date order, or to immediately display the first or last source within the search criteria.

Figure 19:
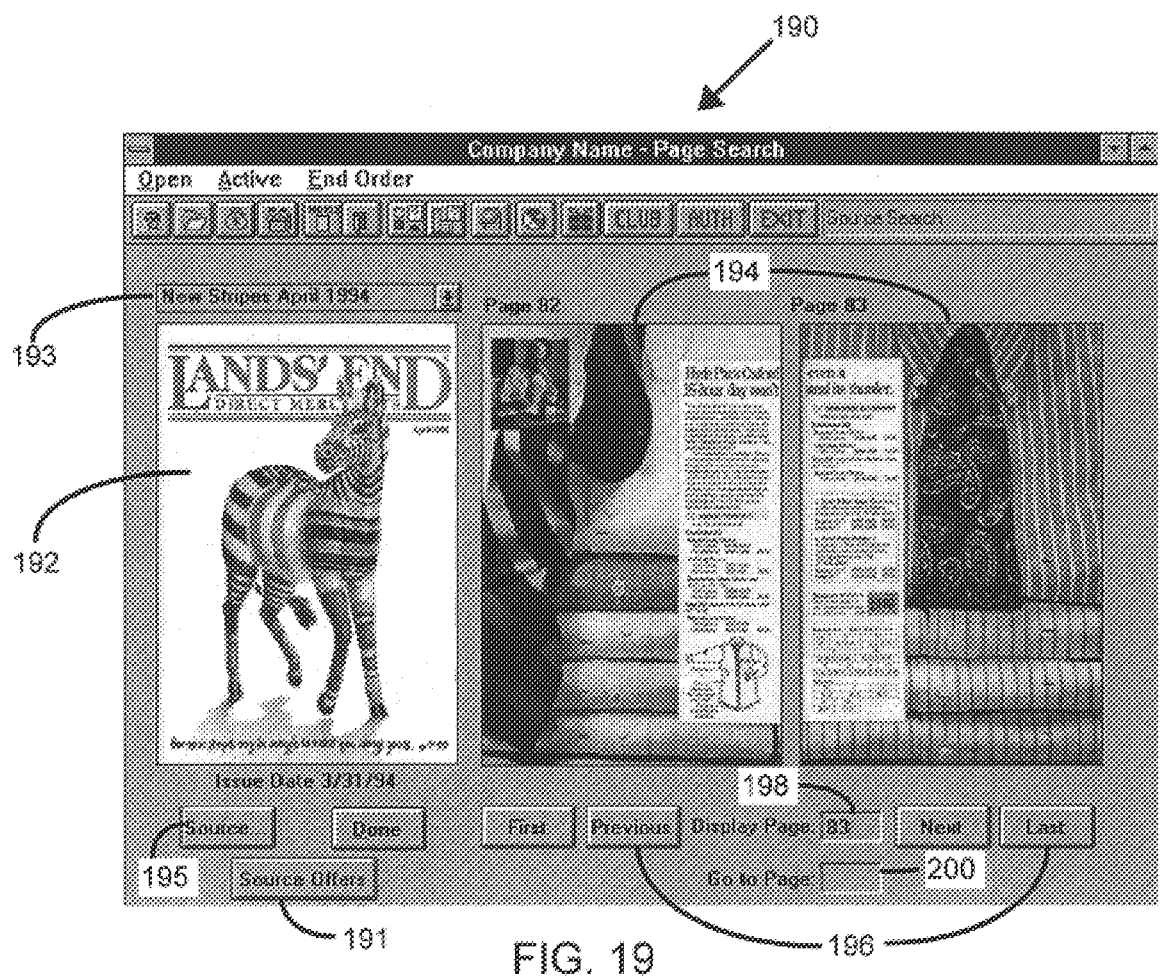
FIG. 19 is a preferred page search user interface for the order capture module of FIG. 6.

If the user wishes to search the selected source by page, a page search window 190 as shown in FIG. 19 may be opened so that the user can continue to process the order. Page search window 190 preferably displays a visual image 192 representing the selected source, as well as a plurality of visual images 194 representing pages from the source. Upon opening window 190, two visual images 194 representing the first two pages from the selected source are preferably displayed. The number of visual images 194 displayed, however, is not critical.

Page search window 190 also preferably allows the user to automatically change to a different source without having to return to source search window 140. This is accomplished by selecting a source from source data capture field 193. The user may also automatically return to source search window 140 by selecting the source button 195.

Figure 20:
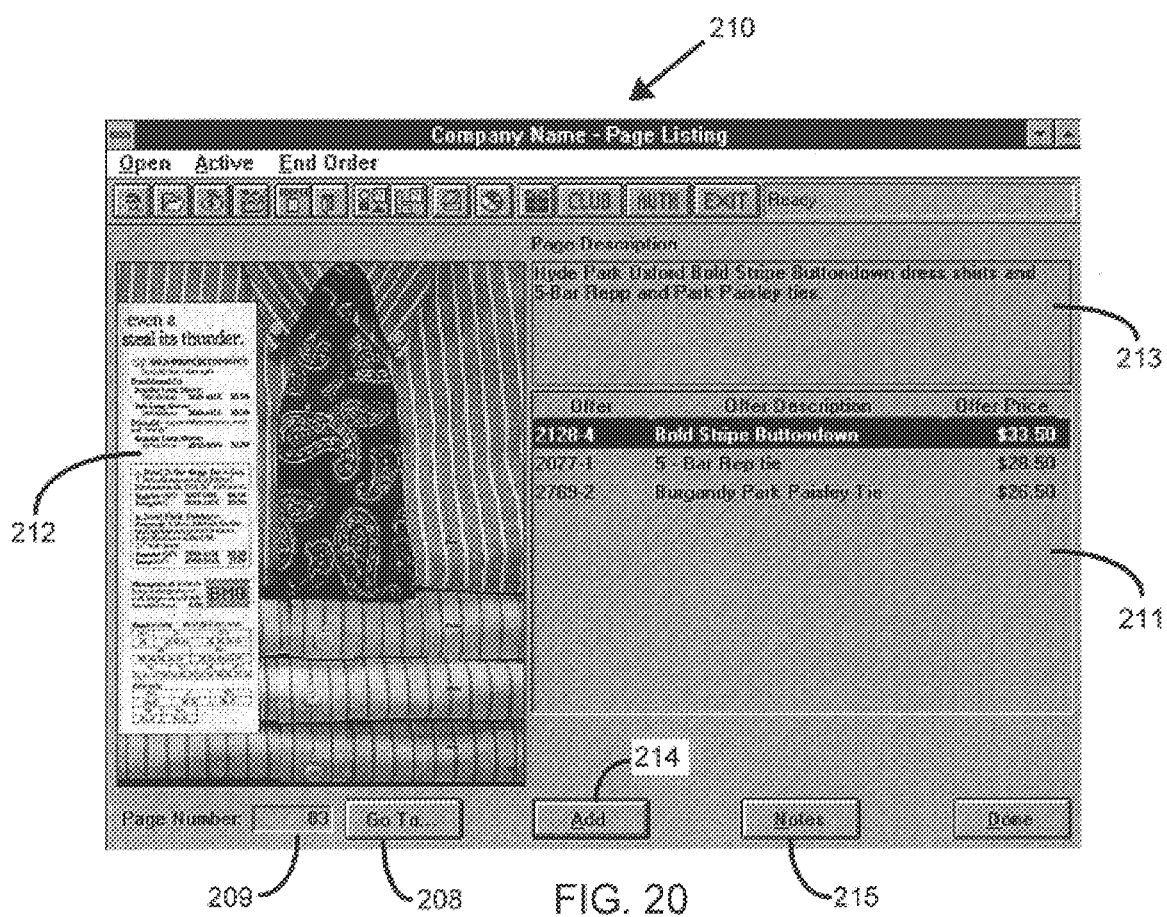
FIG. 20 is a preferred page offer user interface for the order capture module of FIG. 6.

Buttons 196 may be provided on page search window 190 for allowing the user to scroll through the pages of the selected source either one at a time in an ascending or descending page number order, or to immediately display the first or last page. The user also preferably has the option to automatically pull up a particular page within the source while still staying in page search window 190 via a page data capture field 198. If the desired page is found, the user may view the offers associated with that page by entering the corresponding page number in a go to page data capture field 200, which automatically opens a page offer window 210 as is shown in FIG. 20.

Page offer window 210 preferably displays a visual image 212 of the particular page selected from page search window 190, and identifies all of the offers associated with that page in offer data capture field 211. A page number data capture field 209 and corresponding go to button 208 may be provided to allow the user to selectively change pages.

Information about each offer identified in offer data capture field 211 may be displayed in the page description data capture field 213. Additional information about the offers, such as warranty information, may be automatically displayed by selecting the notes button 215. Offers can be ordered directly from this window by selecting the add button 214.

Figure 21:
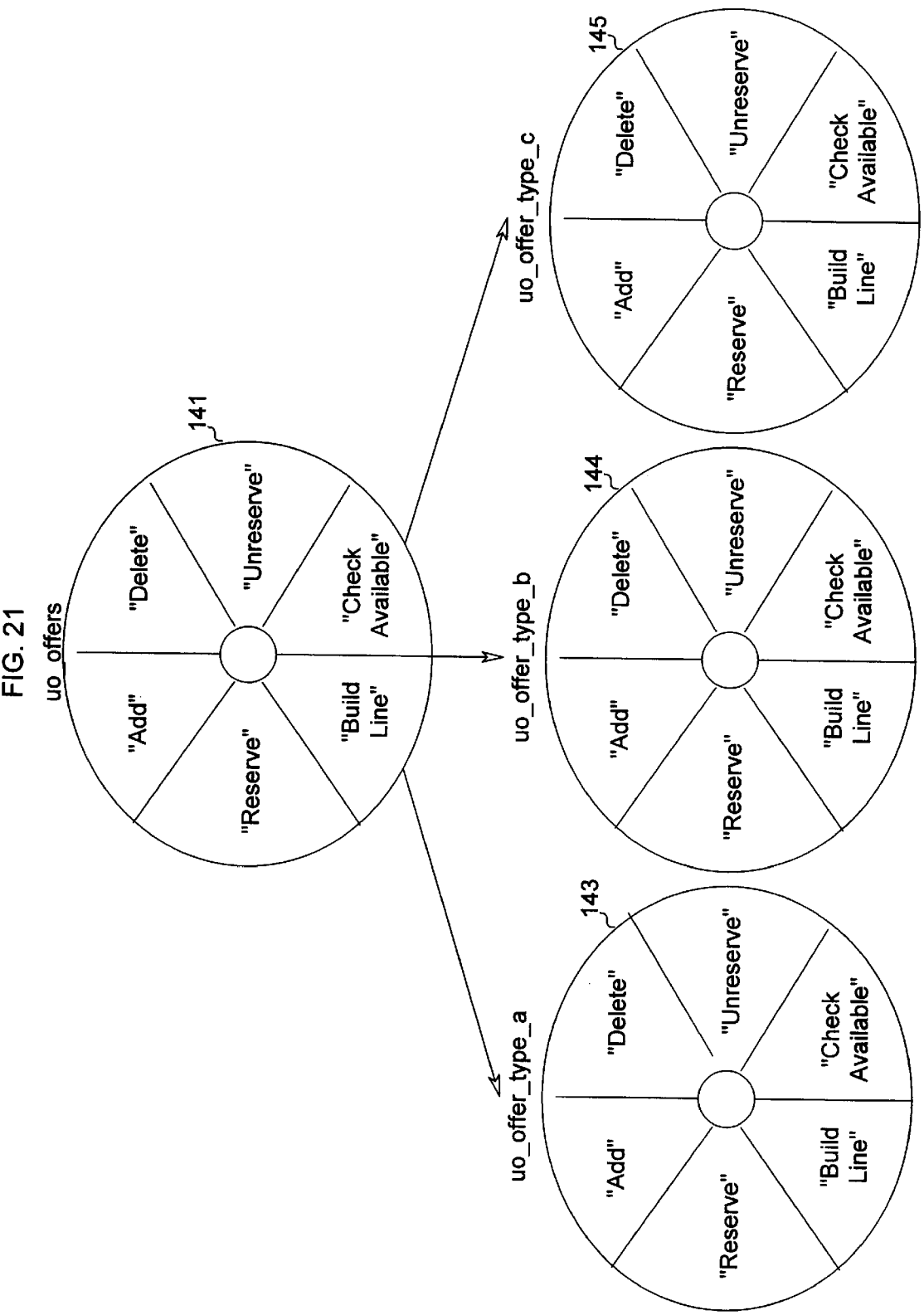
FIG. 21 is a preferred object inheritance structure for an offer object of the order capture module of FIG. 6.

An offer is an item presented to the customer at a specific price. An offer is represented by an offer object 141 as is shown in FIG. 21. As is shown in FIG. 21, the offers available through the preferred system include a single-SKU offer object 143, a multi-attribute offer object 144, and a multi-SKU offer object 145. Single SKU offer object 143 refers to one offer having one SKU. Multi-attribute offer object 144 refers to one offer available with various attributes, such as color or size. Multi-SKU offer object 145 refers to a combination of two offers, such as a shirt and tie combination.

However, in order to interface with back-end systems 8, each of the offers ordered by the customer must correspond to a single SKU. Accordingly, the preferred system translates each combination of attributes for the offer and each combination of two offers into a unique SKU. With such a configuration, new offer objects may be added without affecting existing offer objects. Rather, the new offer object absorbs the properties of the existing offer objects. The only change that is necessary is a change to the inventory business rules.

Figure 22:
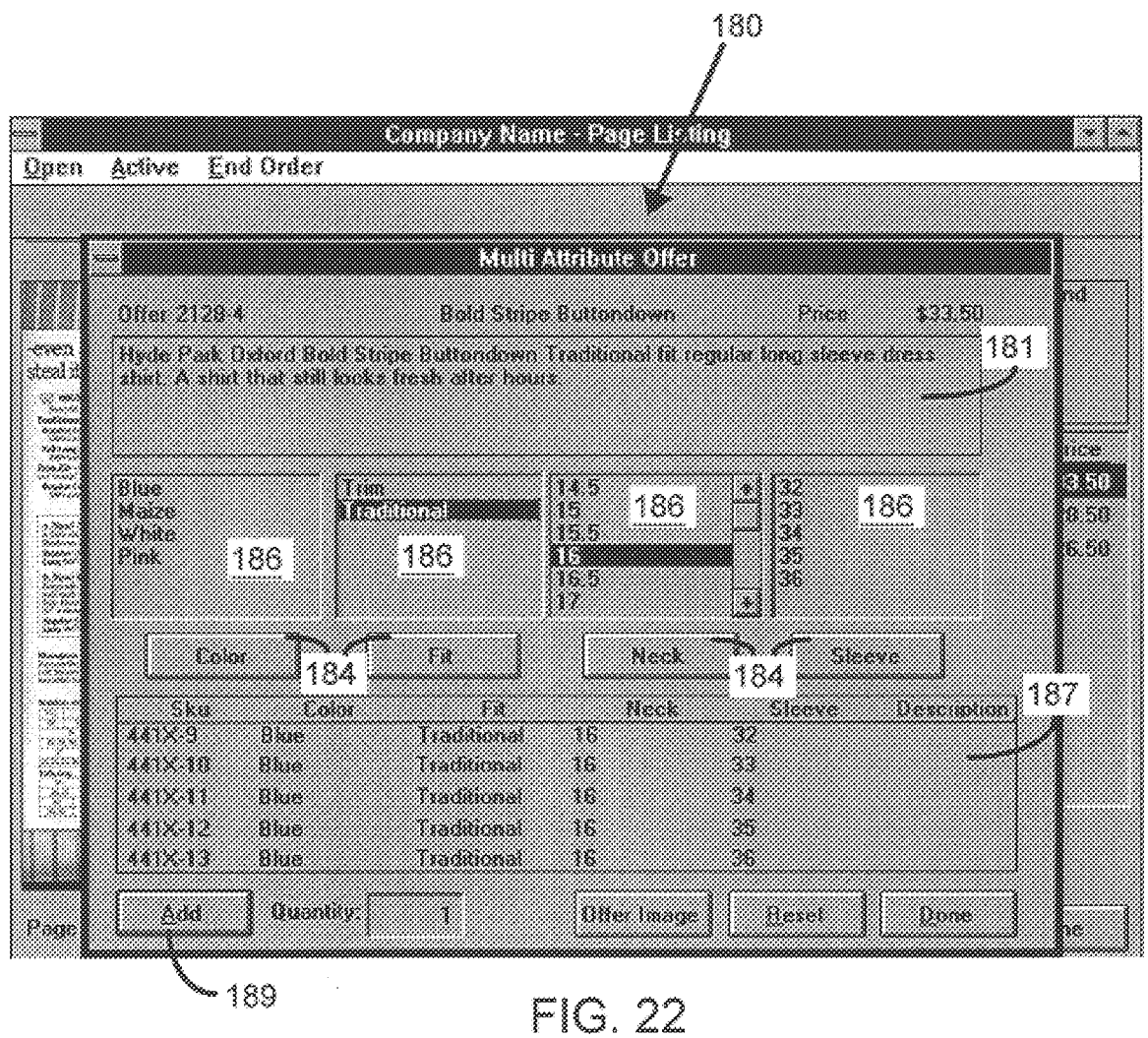
FIG. 22 is a preferred multi-attribute user interface for the order capture module of FIG. 6.

Upon selecting add button 214 from page offer window 210, if a multi-attribute offer is selected by the user, a multi-attribute offer window 180 as shown in FIG. 22 pops open. A preferred multi attribute offer window 180 displays all offer combinations associated with a particular offer. An offer description is preferably displayed in offer description data capture field 181. Each of the offer's attributes are preferably displayed in attribute data capture fields 186. Each attribute is preferably associated with corresponding attribute button 184. For the example shown in FIG. 22, four attributes are identified, namely color, fit, neck and sleeve. The number and type of attributes displayed changes with the offer. In a preferred form, the system allows up to fifteen (15) attributes. Such attributes may include color, size, fit, fabric, collar type, length, width, neck size, sleeve length and pattern.

Figure 23:
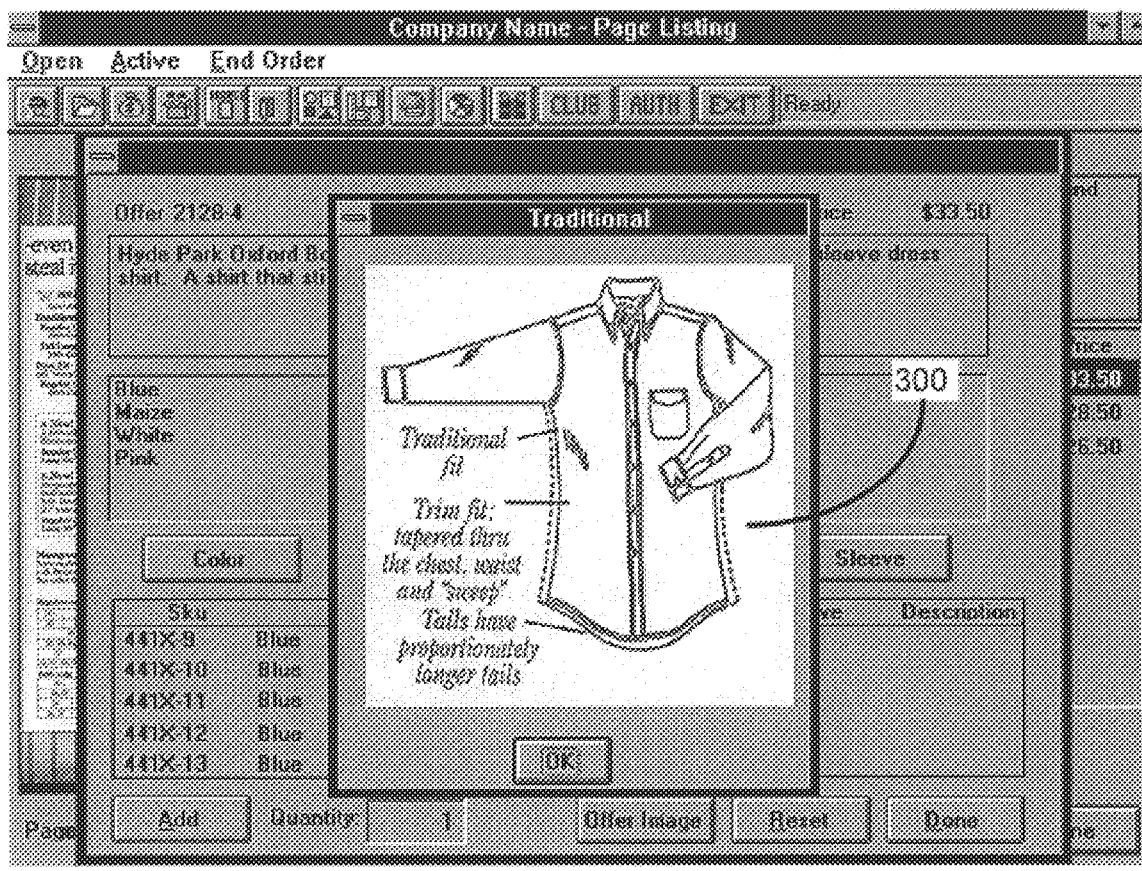
FIG. 23 is a preferred attribute information user interface for the order capture module of FIG. 6.

In the preferred system, the user may obtain more information on a particular attribute from additional windows by selecting the particular attribute button. For example, upon selection of the fit attribute button, a fit attribute window 300 as shown in FIG. 23 pops open and displays a picture and/or text to further describe the selected fit.

Referring back to FIG. 22, an offer combination data capture field 187 displays the offer associated with all of the offer combinations available for the selected offers. This field is continually filtered as the user selects the attributes requested by the customer. After one offer is selected from offer combination data capture field 187, the user can add the offer to the order by selecting the add button 189. A visual image of the offer may preferably be displayed by selecting the offer image button 182. The visual image depicted can represent the offer having the selected attribute choices. This helps the user describe the offer when the customer requests information about a particular offer.

Figure 24:
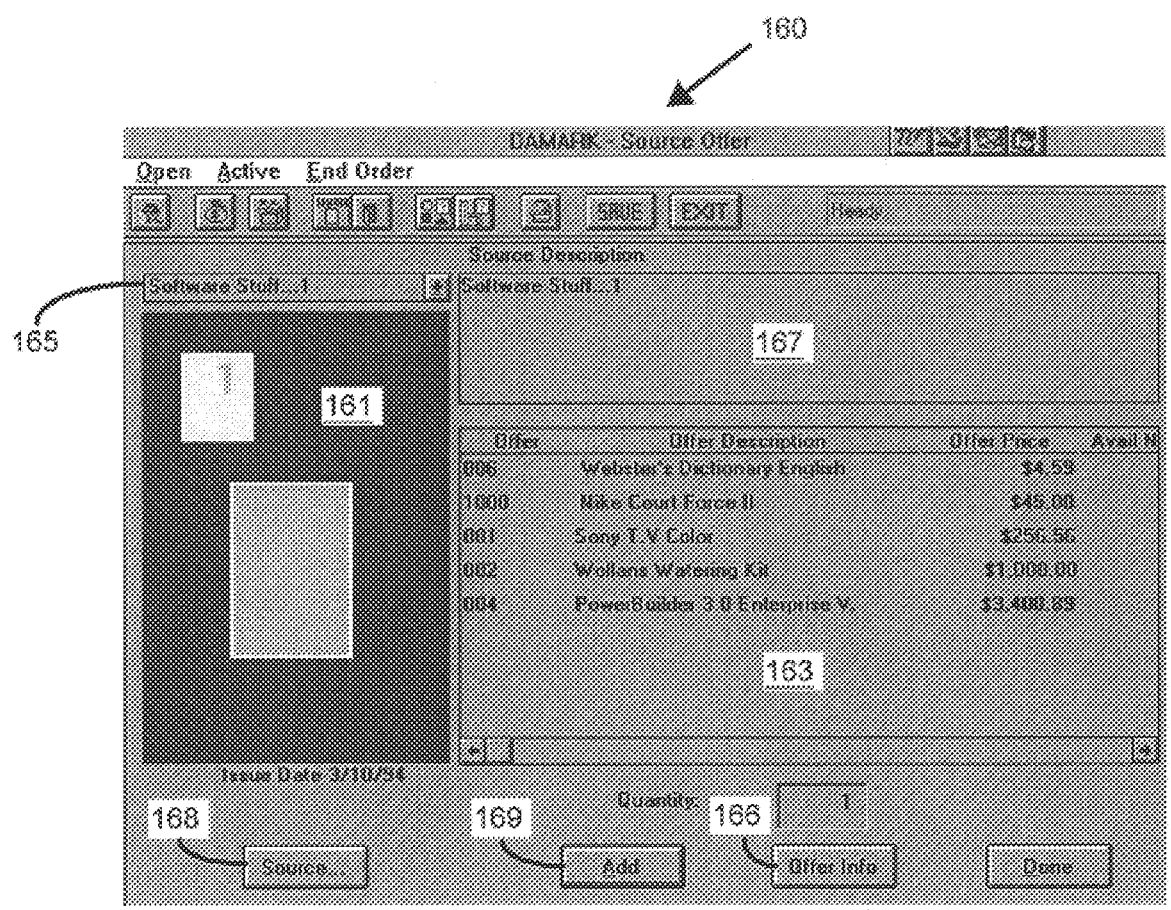
FIG. 24 is a preferred source offer user interface for the order capture module of FIG. 6.

Referring back to FIG. 19, page search window 190 may also provide a source offer button 191 which, when selected, opens a source offer window 160 as shown in FIG. 24. Source offer window 160 may also be accessed by selecting a source from source search window 140 of FIG. 18. Source offer window 160 typically is used to display all of the offers available through the selected source, along with their respective prices at a data capture field 163. Additional information about each offer identified in data capture field 163 may be displayed in the source description data capture field 167. A visual image 161 of the source selected is also preferably displayed. Window 160 also preferably allows the user to change to a different source without having to return to source search window 140 by selecting a source from source data capture field 165. The offers associated with a source are automatically updated as the source changes. Selection of the source button 168 automatically takes the user back to source search window 140.

Upon selecting one of the offers identified in source offer window 160, the user preferably has two choices. First, the user may obtain information about the selected offer by selecting the offer information button 166. Second, the user may order the selected offer by selecting the add button 169. As described earlier herein, if a multi-attribute offer is selected by the user, a multi-attribute offer window 180 as shown in FIG. 21 pops open.

Figure 25:
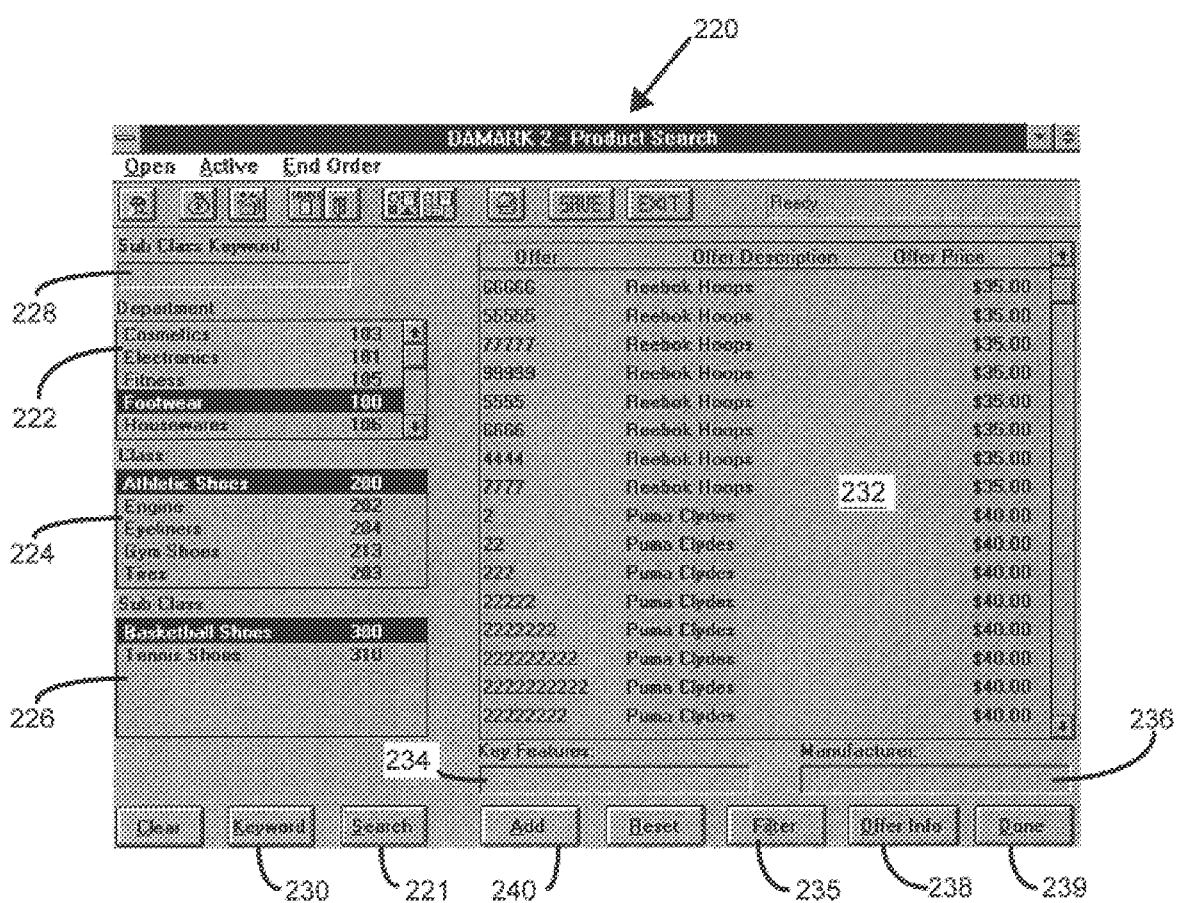
FIG. 25 is a preferred offer search user interface for the order capture module of FIG. 6.

As previously mentioned, the user can also search for offers by conducting an offer search. Upon activation of offer lookup button 52g, an offer search window 220 as is shown in FIG. 25 opens. Offer search window 220 is typically used to search for offers based on customer criteria and is often used when a customer does not have a specific source from which to refer. Window 220 preferably identifies offer search criteria data capture fields, which preferably include offer category search criteria data capture field 222, offer class search criteria data capture field 224 and offer sub-class search criteria data capture field 226.

Each offer class search criteria identified in offer class search criteria data capture field 224 is normally associated with at least one offer category search criteria. Preferably, each offer class search criteria identified in offer class search criteria data capture field 224 is associated with a plurality of offer category search criteria so as to define a separate search path for each offer category/offer class association. With such a configuration, an offer may be searched in a multitude of ways. Offer sub-class preferably has the same relationship to offer class.

Upon entering window 220, normally only offer category search criteria data capture field 222 is filled with information. The user preferably has two options; namely to capture a keyword in the keyword data capture field 228 or to select an offer category search criteria from offer category search criteria data capture field 222. When the user selects an offer category search criteria and selects the search button 221, all of the offer class search criteria that are associated with that offer category search criteria are preferably automatically displayed in offer class search criteria data capture field 224. After an offer class search criteria is selected and search button 221 is selected, all of the offer sub-class search criteria associated with that offer class search criteria are automatically displayed in offer sub-class search criteria data capture field 226.

When the user enters a keyword into keyword data capture field 228 and selects the keyword button 230, the associated offer categories, offer classes and offer sub-classes are preferably automatically displayed on window 220. If there is more than one offer category, the offer class search criteria data capture field 224 and offer sub-class search criteria data capture field 226 will typically be empty until the user selects an offer category search criteria. If there is more than one offer class, offer sub-class search criteria data capture field 226 will typically be empty until the user selects an offer class search criteria. If an offer sub-class exists for the offer class search criteria selected, it normally must be selected before searching for associated offers.

Offers uncovered through the offer search are automatically displayed in the offer data capture field 232. The user can further filter the list of offers by entering information in the key features data capture field 234 or the manufacturer data capture field 236 and selecting the filter button 235. Information about a particular offer can be displayed by selecting the offer information button 238. When a specific offer is selected, the add button 240 may be used to add the offer to the order. Upon selecting add button 240, an order quantity window (not shown) preferably opens so that a quantity can be captured. In this manner, the user is able to confirm the quantity of an offer being purchased by the customer before actually adding it to the order. Window 220 closes upon selecting the done button 239.

Figure 26:
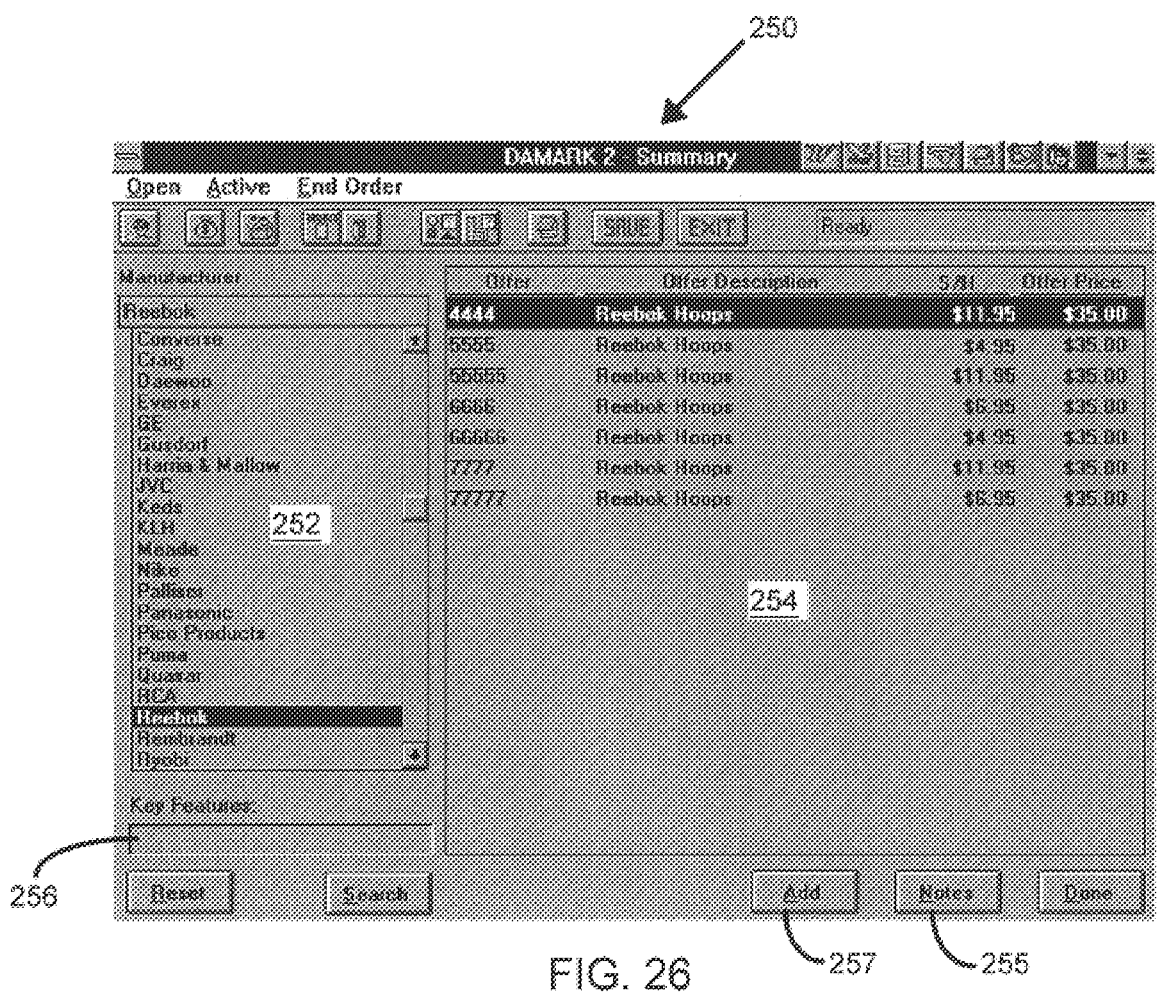
FIG. 26 is a preferred manufacturer search user interface for the order capture module of FIG. 6.

As previously mentioned, the user may also search for offers by performing a manufacturer search. Upon selection of manufacturer search button 52h, the manufacturer search window 250 as shown in FIG. 26 automatically opens. Through window 250, the user can search for an offer based on the offer'manufacturer. This window is typically used when a customer does not have a specific source from which to refer.

When manufacturer search window 250 is opened, a list of manufacturer search criteria are identified in the manufacturer search criteria data capture field 252. The user normally must select a manufacturer search criteria before searching for associated offers. If the user chooses to search, all offers made by the selected manufacturer are displayed in the offer data capture field 254. The user preferably can further filter the list of offers displayed in offer data capture field 254 by entering searching criteria in the key feature data capture field 256.

Once an offer has been selected, further information about that offer can preferably be obtained by selecting the notes button 255. The user may also add the selected offer by selecting the add button 257. Upon selecting add button 257, an order quantity window (not shown) automatically opens so that a quantity can be captured. In this manner, the user is able to confirm the quantity of an offer being purchased by the customer before adding it to the order.

Referring back to FIG. 17, order capture module 34 also preferably provides several other advantageous features. It allows the user to keep track of lost demand via a lost demand reason codes window (not shown). This window displays a list of possible reason codes the user can select to account for a decrease in demand, such as credit card decline or customer request. The list of reason codes displayed is governed by the action that precipitated the lost demand (e.g. canceling of an order).

Order capture module 34 also preferably provides for the cross-sell of additional product offering which may be suggested to the customer based on the customer's current order. Order capture module 34 may also be adapted to base such cross-selling on the customer's past purchasing history and general demographic information. When the customer places an order, an add-on window 400 may be opened, and displays a description of any add-on products that are associated with the offer just ordered by the customer. For example, if a customer ordered a television, add-on window 400 may display a video cassette recorder (VCR) and a VCR/TV adapter kit.

If an ordered product is not available, a backorder window 402 preferably opens and provides the customer with four choices. He or she may order the quantity that is available and accept the backorder quantity to be shipped at a later time, order only the available quantity, choose to order an alternate or substitute offer (if one exists), or cancel the whole quantity of the original product. If the customer chooses to order a substitute, substitution window opens and displays a list of available substitutes. When an item is out of stock, either the item will automatically be substituted with the same item from a different vendor (for the same price), or a list of substitute items will be displayed. The customer may choose to substitute the original item with an item displayed in the list or choose from the list of alternate items.

SHIPPING MODULE

Figure 27A:
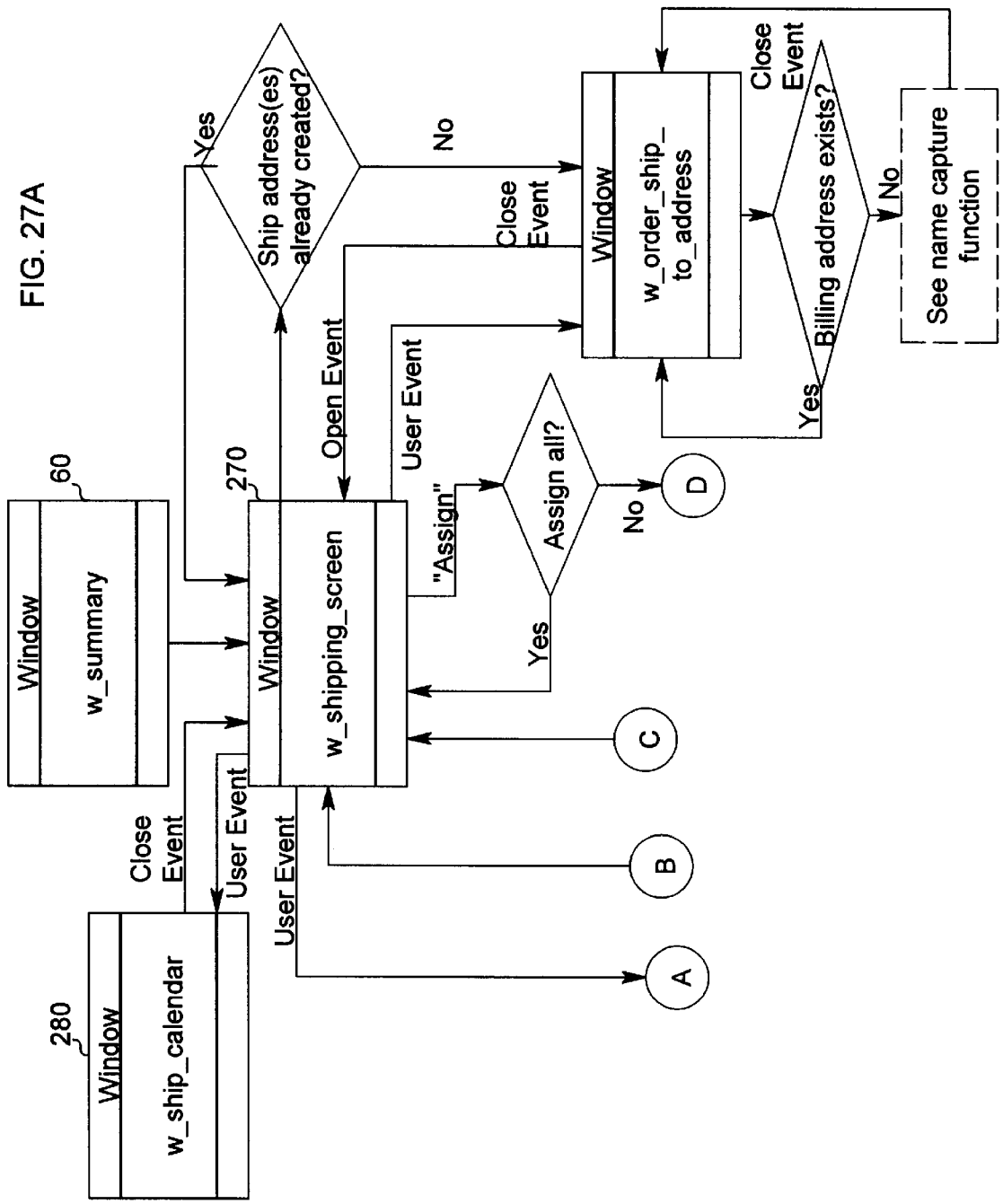
FIG. 27 is a detailed dialog flow for the shipping module of FIG. 6.
Figure 28:
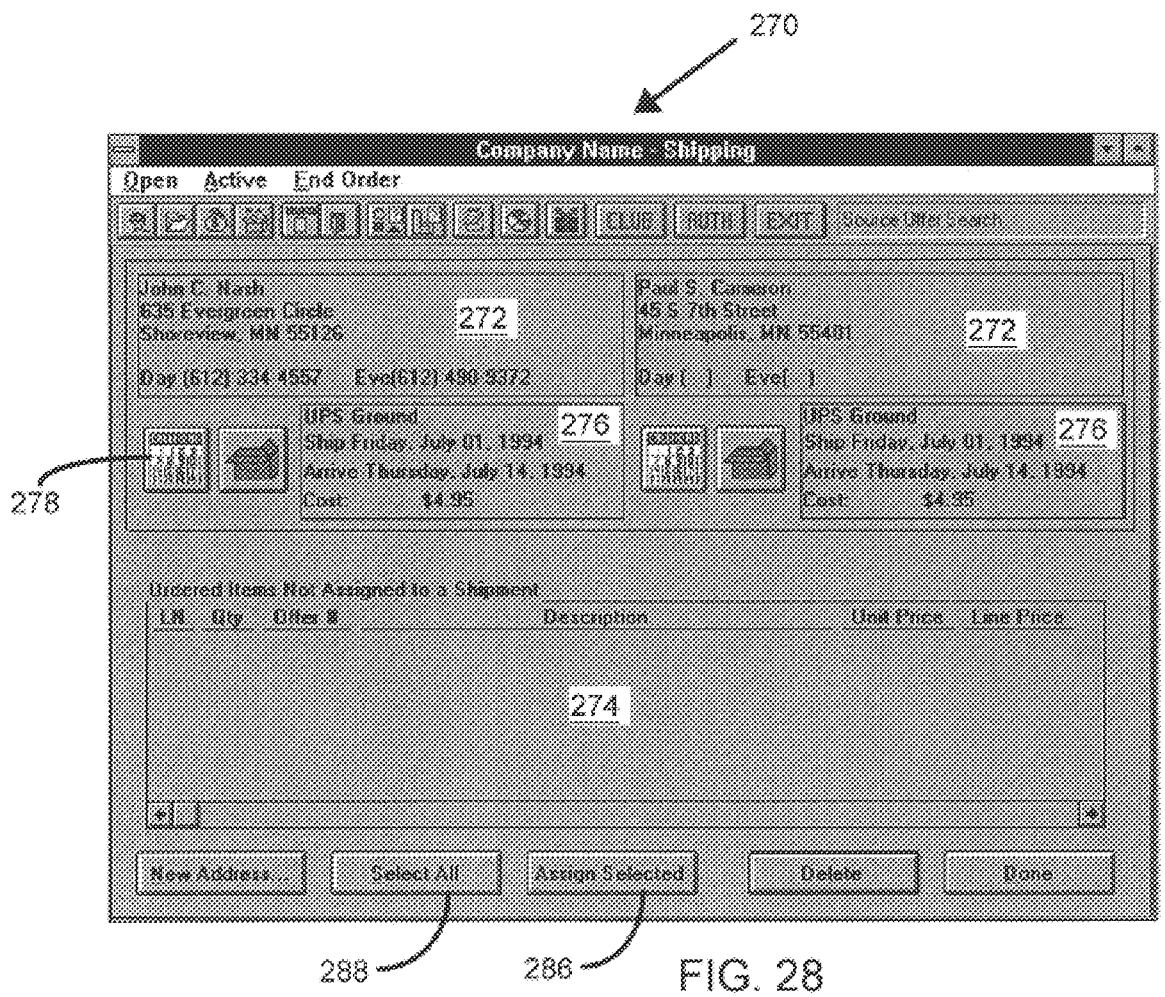
FIG. 28 is a preferred shipping user interface for the shipping module of FIG. 6.

Shipping module 38 identifies the way in which offers ordered by a customer may be shipped. A detailed dialog flow for shipping module 38 is shown in FIG. 27. Upon selecting shipping button 54d from toolbar 52 of the user interface shown in FIG. 7, a shipping window 270 as is shown in FIG. 28 opens. Shipping window 270 captures ship to addresses in ship to data capture field 272 and assigns ordered offers to those addresses. The user can elect to enter the customer's address information directly (i.e., in the case of a different ship to address than the bill to address) or he or she can use one of the previous ship to addresses, if one exists. The user can also enter one or more new ship to addresses. The entire quantity of an ordered offer can be assigned to a single address or partial quantities can be assigned to multiple addresses.

Shipping window 270 also displays shipping information in data capture fields 276. Such information includes the shipping carrier and shipping service level, the shipping and arrival date and the cost for shipping the order with that carrier and at that service level. As previously stated herein, the preferred system automatically determines the best shipping method based in part on the offer being ordered, the shipping address, and the shipping carrier and shipping service level.

Figure 29:
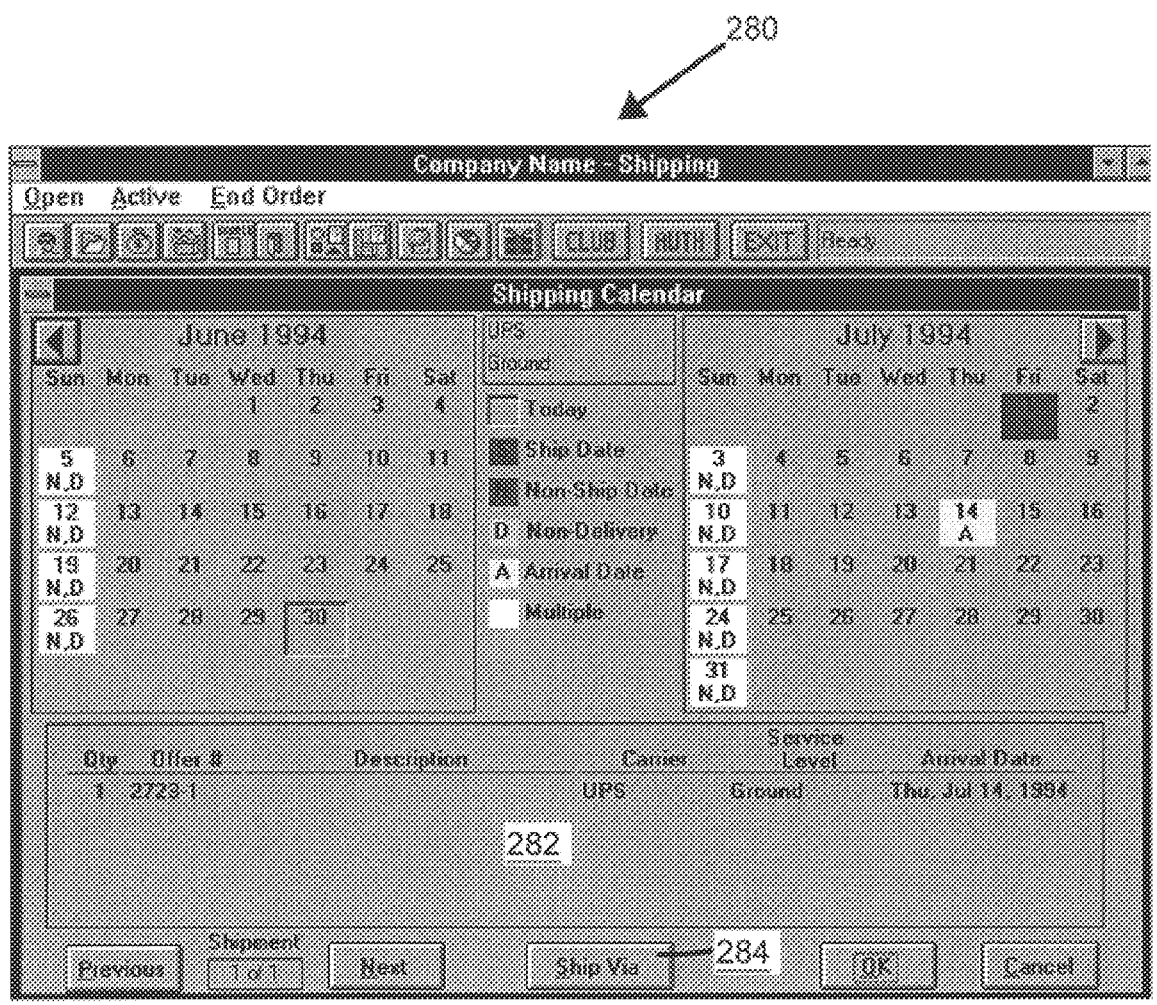
FIG. 29 is a preferred shipping calendar user interface for the shipping module of FIG. 6.

From shipping window 270, the user can select the shipping calendar button 278 to open a shipping calendar window 280, as is shown in FIG. 29. Shipping calendar window 280 preferably displays each shipment for the current address, one at a time at data capture field 282. A shipment is defined as all ordered offers that are being shipped on the same date, to the same address, using the same shipping carrier and shipping service level. The order date, shipping date and delivery date are either alphanumerically or graphically identified on shipping calendar window 280 so that they may be easily identified by the user. Holidays and non-delivery days for the selected carrier and service level are also identified. For example, for the shipment displayed on shipping calendar window 280 of FIG. 29, the order date is Jun. 30, 1994, the ship date is Jul, 1, 1994 and the arrival date is Jul. 14, 1994. Non-delivery dates include all Sundays.

The carrier and service level for the current shipment can be assigned by clicking on the ship via button 284 on shipping window 280 of FIG. 29. The user can choose from all carrier and service level combinations that have passed all validation for the offers in the current shipment and for the ship to address. External shipping instructions that are needed in order for the shipment to arrive to the customer may also be provided to the user.

Shipping window 270 of FIG. 28 also contains a list of all of the ordered offers that have not yet been assigned to a shipment at data capture field 274. The user can assign one or more of the items identified in data capture field 274 to a ship to address by clicking on the assign selected button 286. If all of the ordered offers are to be shipped to the same address, the user may assign the items that address by clicking on the select all button 288. In either case, the user is taken to a ship to contents window 290 as shown in FIG. 27, which displays the selected ship to address and the offers assigned to each shipment for this address. If there are multiple shipments for this address, all shipments will be displayed. The user can delete any offer displayed. Offers can also be transferred from this address to another address. In the case of multiple shipments, a quantity to assign window 292 displays the quantity available to assign or transfer. The user is allowed to modify the quantity that should be assigned as long as it is less than or equal to the quantity available.

Figure 30:
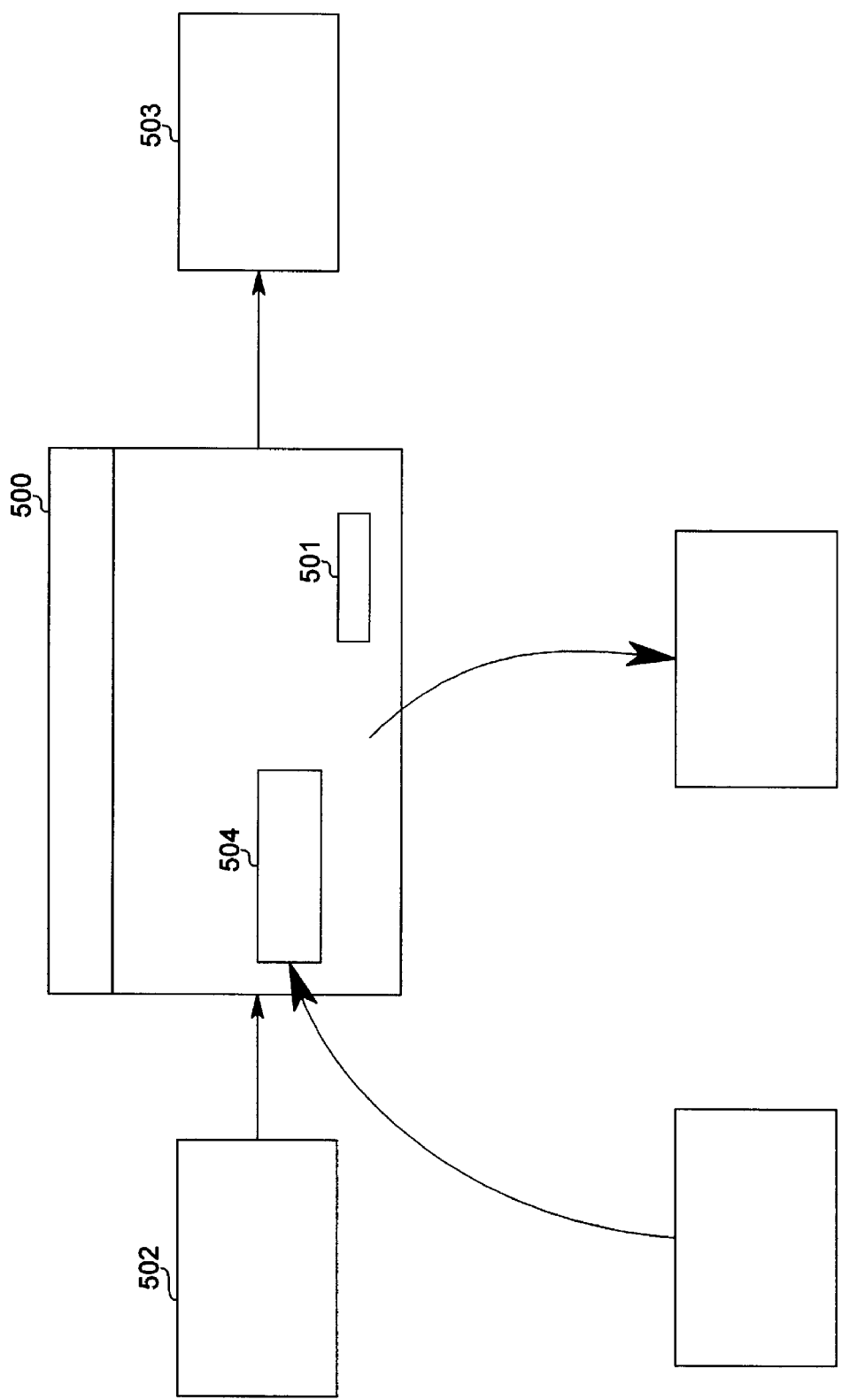
FIG. 30 is a preferred marketing function of the order entry system of FIG. 1.

Order entry system 10 also provides other advantageous functions and features in addition to those identified in the discussion of the modules of FIG. 7. One such function is a marketing function, the concept of which is illustrated in FIG. 30. FIG. 30 shows a user interface represented by a window 500. Window 500 preferably defines a plurality of user-initiated events and a plurality of application points corresponding to the user-initiated events. Such user-initiated events may include selecting a button 501, entering a window 502, exiting a window 503 and capturing data in a data capture field 504.

An action may be assigned to any of the application points corresponding to such user-initiated events. Marketing objects are provided by the preferred order entry system for dynamic invocation of the action upon user initiation of the event corresponding to the application point assigned to the action. With such a configuration, the user is provided with the action at a point during the placement of the order at which the action is needed.

Figure 31:
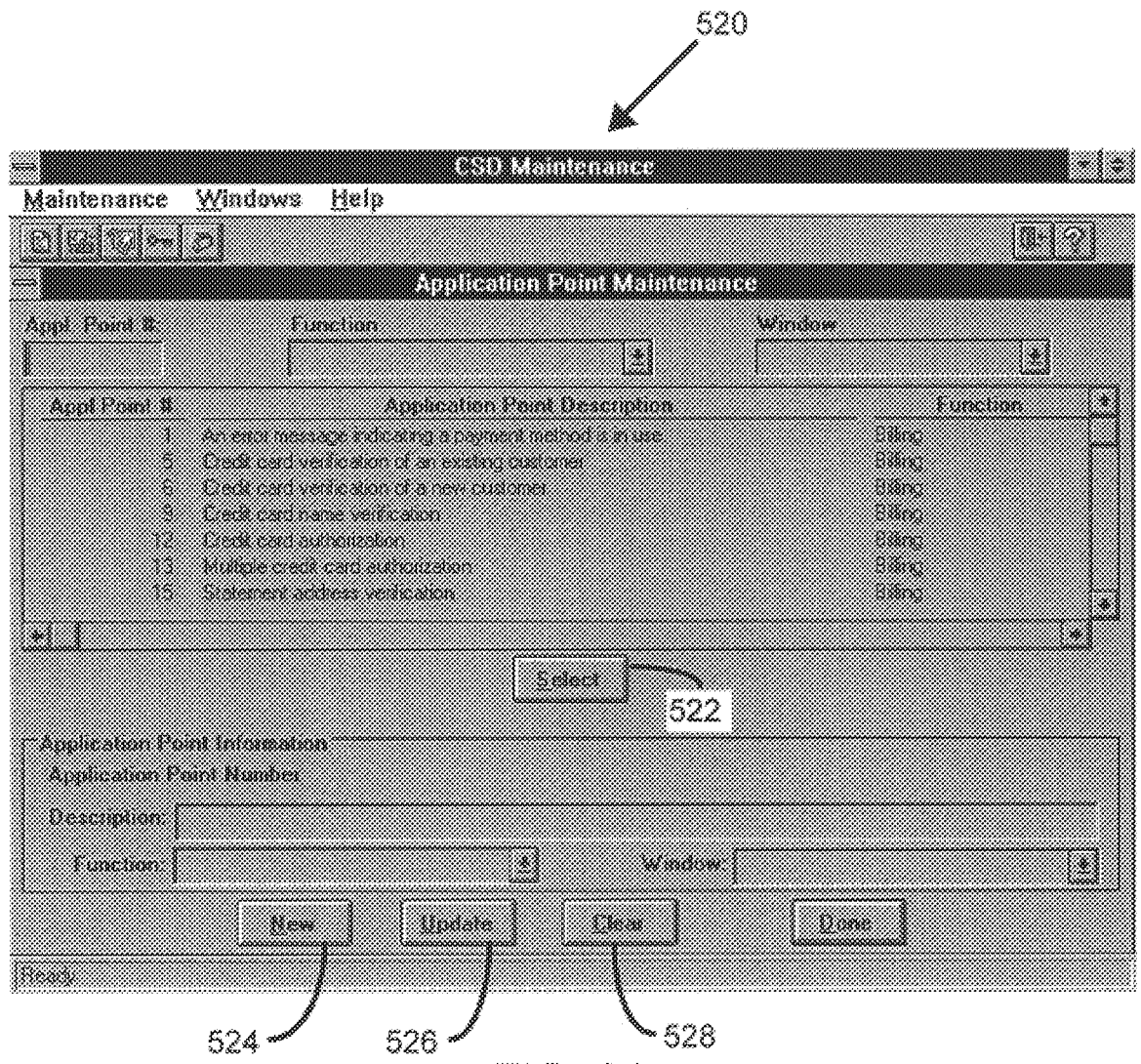
FIG. 31 is a preferred application point maintenance user interface for the order entry system of FIG. 1.

FIG. 31 shows a preferred application point maintenance window 520. Application point maintenance window 520 is designed to allow a system administrator to maintain existing application point descriptions and attributes, as well as to create a new application point record when one is required for use in the system application. The system preferably automatically assigns the next sequential application point. The application point number assignment process also allows the system administrator to distribute an application point that has not been used previously thereby preventing application point.

Referring to FIG. 31, application point maintenance window 520 includes a select button 522 which, when selected, causes highlighted application point information to be displayed in the maintenance area of window 520 to allow the user to edit information or use the information as a basis for a new application point. Selection of the new button 524 causes the information displayed in the maintenance area to be saved to the database as a new application point. Selection of the update button 526 updates the information displayed in the maintenance area that has been modified by the user. The clear button 528 clears all of the information in the maintenance area. Any changes that have been made to the information there that have not been updated to the database using new button 524 or update button 526 are not saved.

System 10 preferably allows the user to selectively activate and de-activate any of the application points associated with the marketing object, as well as to selectively change the assignment of an action. In addition, the preferred system allows the user to assign the application points such that a plurality of user experience levels is achieved, as well as to set the frequency at which the action is initiated.

The action that is initiated may be any type of event. One such action can be to display a message. The message can be instructions to the user to help him or her in the placement of an order. In this regard, marketing objects preferably have the capability to display the message in a plurality of languages.

The action may also be providing a marketing promotion. Such promotions may include product-to-product cross sell, free gifts, dollar or percentage off a line item, the order, the shipping or the handling coupons, a gift, a coupon, a discount, a payment type discount, a shipment service level discount, and a shipping and handling discount. They are typically driven by order and customer characteristics. Order characteristics may include total dollar amount, total line item, line quantity, and payment method to name a few. Customer characteristics may include promotion success rate, average order size, length of customer, order frequency, and payment history to name a few.

Figure 35:
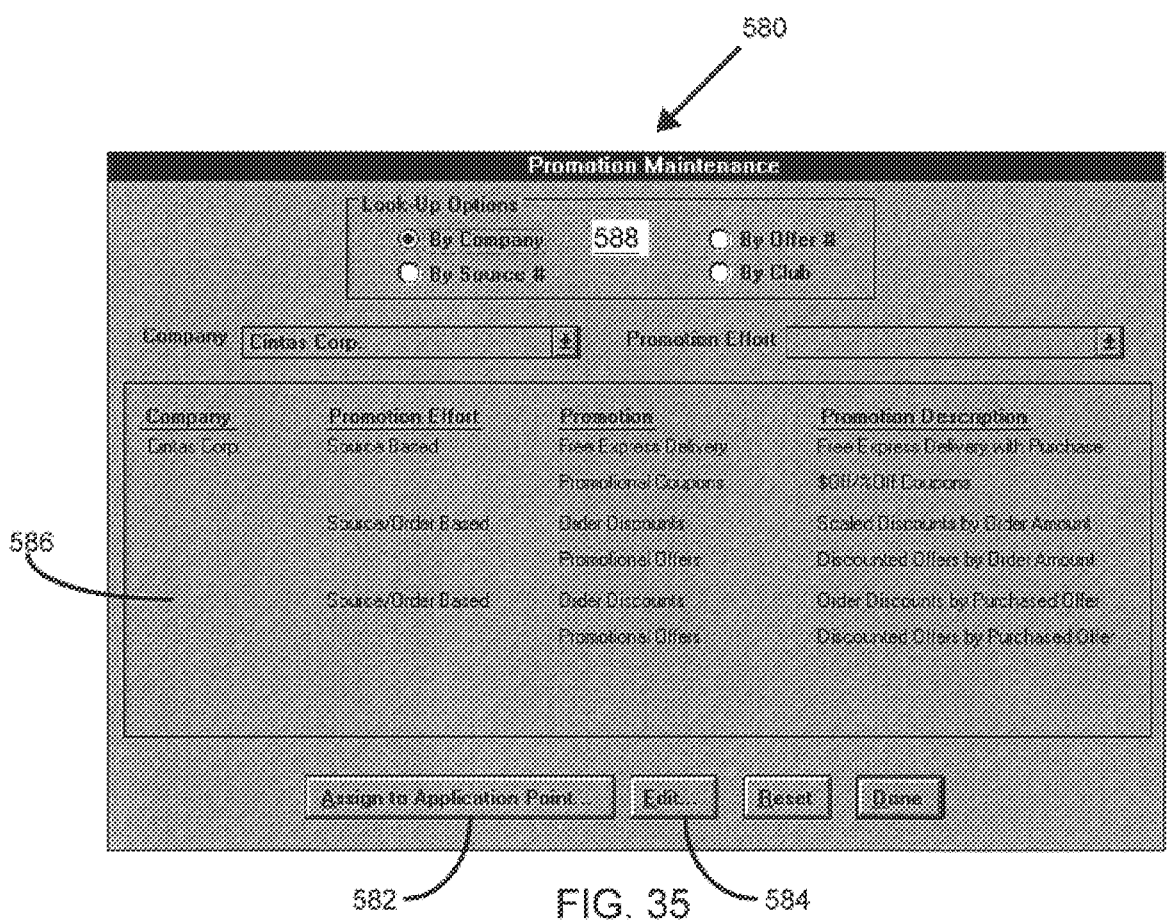
FIG. 35 is a preferred promotion maintenance user interface for the order entry system of FIG. 1.

FIG. 35 illustrates a promotion maintenance window 580. Promotion maintenance window 580 displays existing marketing promotions in promotion display data capture field 586. The user preferably may look up promotions by any of four options identified in the options data capture field 588, namely, company, source, offer number or club. The information retrieved from a look up function may be limited by selecting a specific company or promotion effort. Once a promotion is selected, the user may assign the promotion to a particular application point via the assign to application point button 582 or choose to edit the promotion via the edit button 584.

Figure 36:
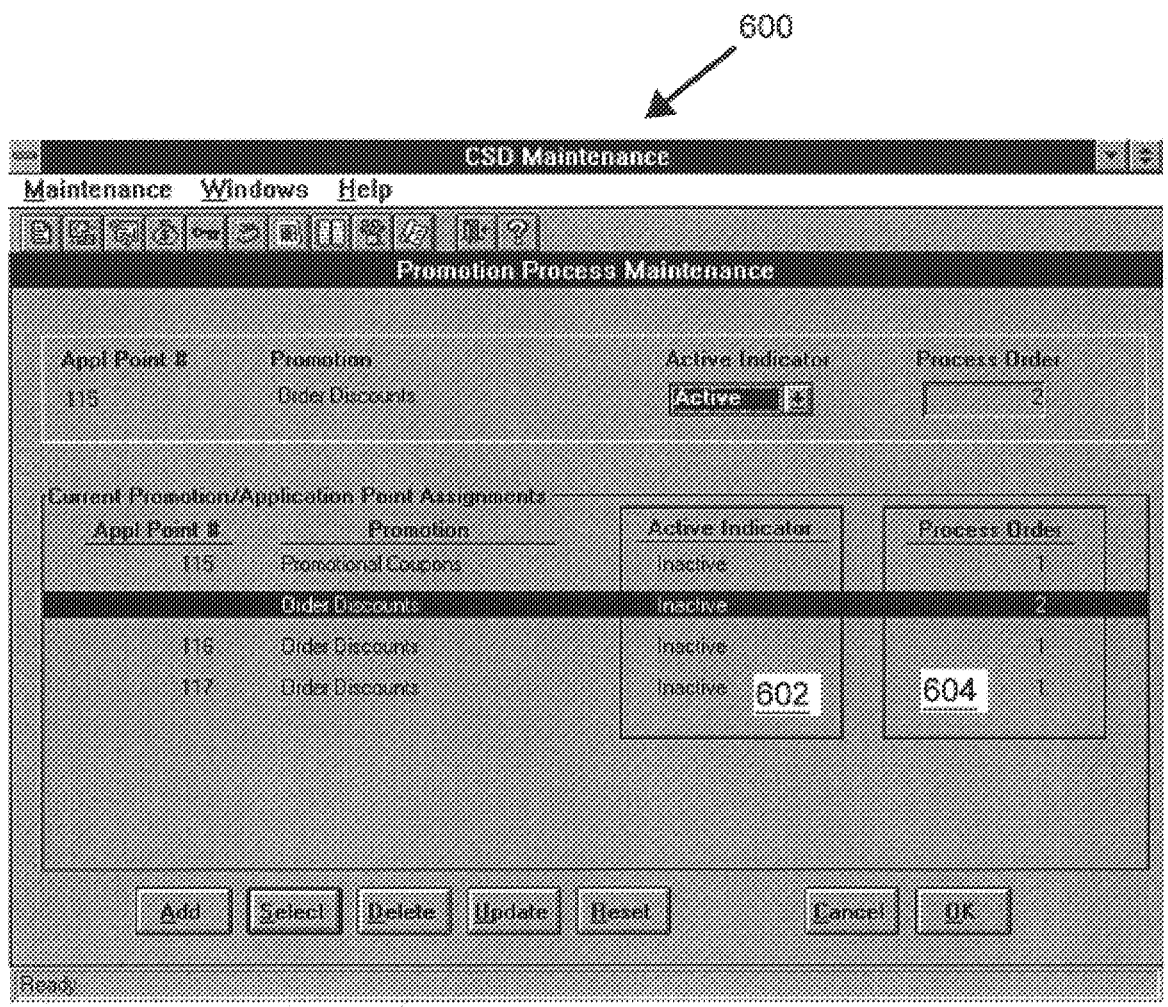
FIG. 36 is a preferred promotion process maintenance for the order entry system of FIG. 1.

FIG. 36 illustrates a promotion process maintenance window 600. Promotion process maintenance window 600 provides the user with the ability to assign promotions to specific application points. An application point determines where in the application a particular promotion will be prompted. Preferably, the user is also able to specify whether the promotion is active or inactive via active indicator data capture field 602, and the order in which the promotions will be processed via the process order data capture field 604.

Figure 32:
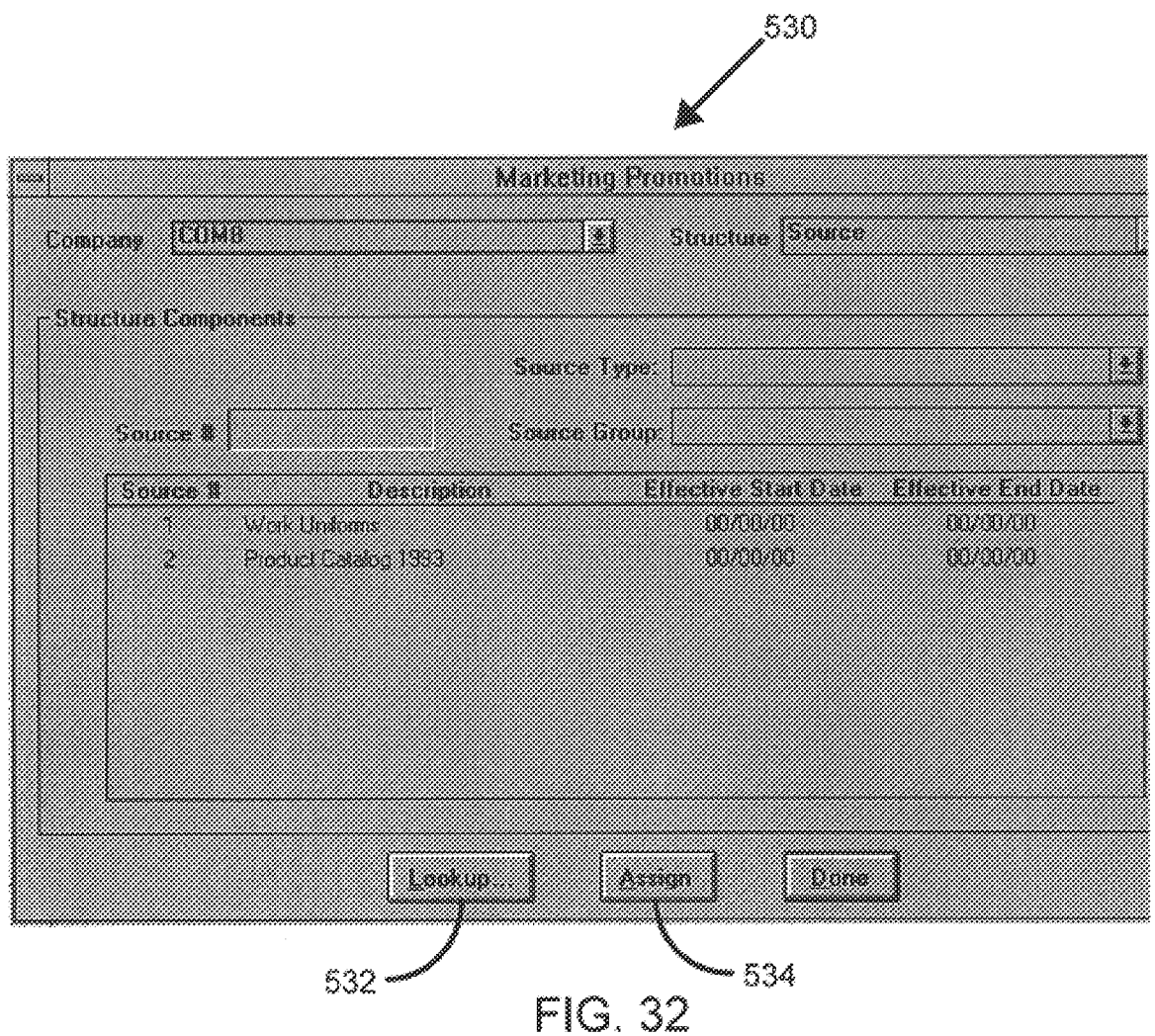
FIG. 32 is a preferred marketing promotion user interface for the order entry system of FIG. 1.

FIG. 32 shows a marketing promotions window 530 which allows the user to select current marketing promotions based on the type of promotion structure selected. Once the proper promotion structure's components have been selected, the user may look up existing promotion action types assigned to the promotion by selecting lookup button 532, or assign new promotion action types to the promotion structure components by selecting assignment button 534.

Figure 33:
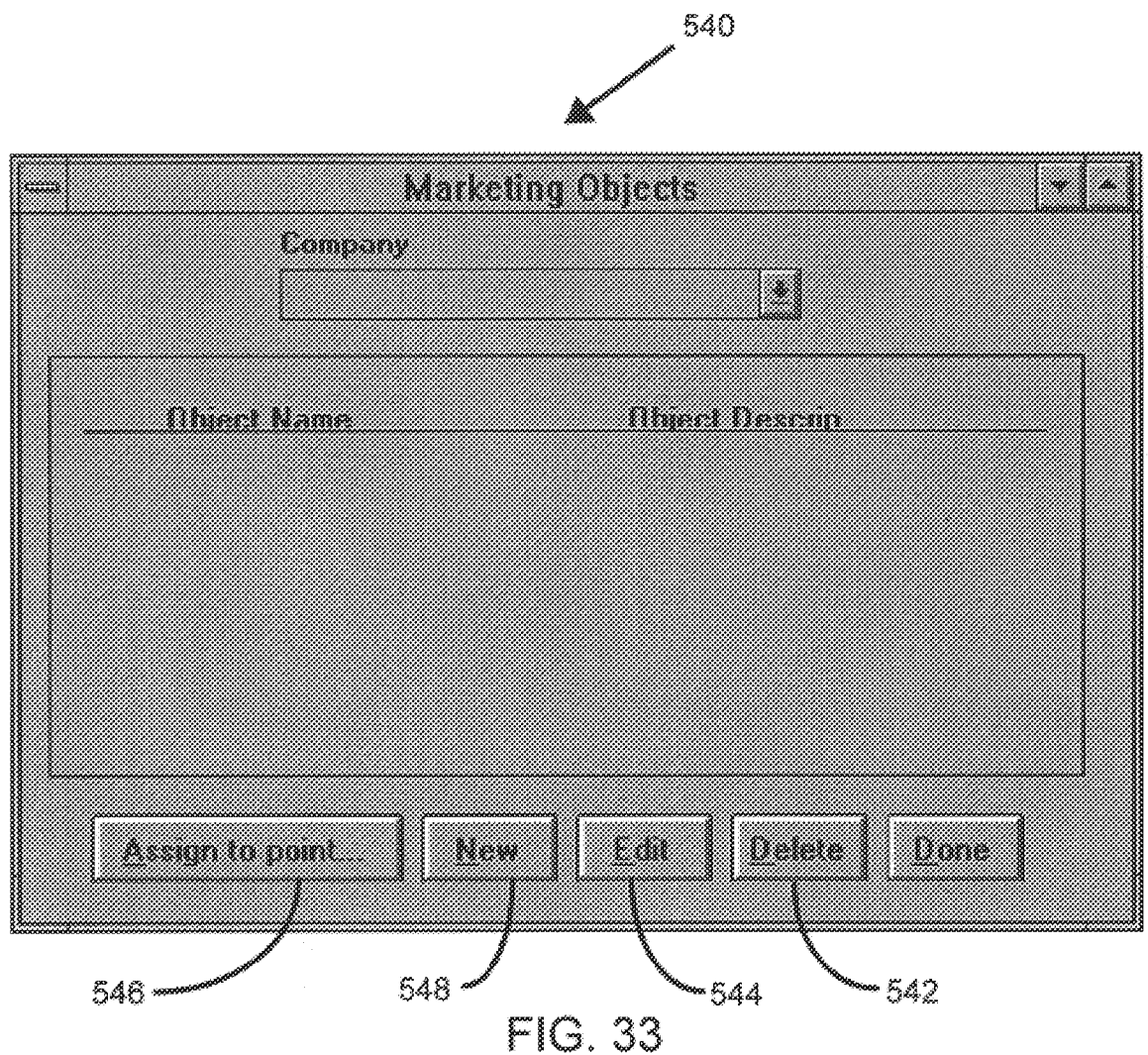
FIG. 33 is a preferred marketing objects user interface for the order entry system of FIG. 1.

FIG. 33 shows a marketing objects window 540 which allows the user to add, modify and delete objects as well as assign marketing objects to application points. When opened, window 540 captures all companies currently set up on the system's company data table and all marketing objects for the first company on the list. By selecting a new company, the marketing objects in marketing objects window 540 will be updated to reflect only those marketing objects for the company selected. From here, the user can delete a marketing object via the delete button 542, update a marketing object via the edit button 544, or assign a marketing object to an application point. The new button 548 can be pressed to set up new marketing objects.

Figure 34:
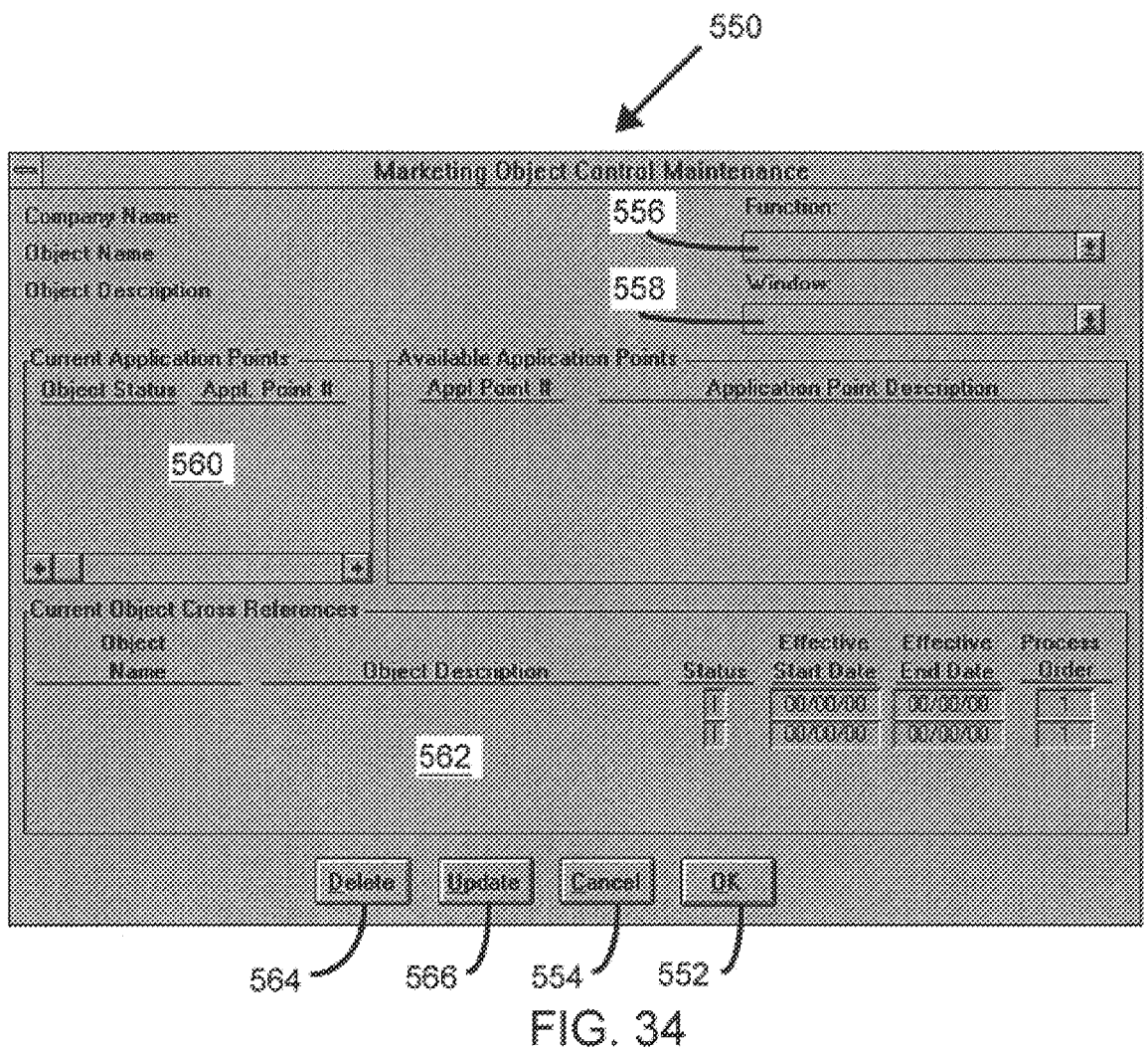
FIG. 34 is a preferred marketing objects maintenance user interface for the order entry system of FIG. 1.

From marketing objects window 540, the user may open a marketing object maintenance window 550 as shown in FIG. 34. Window 540 allows the user to enter the marketing object's file name and description, and to add, edit and delete marketing object/application point cross reference records. These records are used to execute marketing objects when certain application points are triggered in the system's application. When first opened, window 550 displays the object information that was selected from marketing objects window 540, current application points that are tied to the selected marketing object, and available application points that may be tied to the selected marketing object. The available application points are a subset of all application points available. The application points are filtered by selecting a function/window combination from function data capture field 556 and window data capture field 558.

Once opened, the user selects either an existing cross reference record from the current application points identified in the current application point data capture field 560, or a new application point. All marketing objects that are tied to the application point selected are automatically displayed in the current object cross references area data capture field 562. This will ensure that the user has visibility to all objects that will be processed when the application point is triggered. To delete cross references, the user selects a row on the current object cross references area and presses the delete button 564. This will delete the row off the screen. Once all the updates to cross references have been made, including deletions, the user presses the update button 566 to save the changes to the database. Pressing the cancel button 554 clears all changes made without saving.

We claim:

1. A computerized system for the placement of an order by a user for at least one of a plurality of offers via a terminal having a display, the system comprising:

(a) storage means for storing offer information relating to the plurality of offers, and for storing electronic reproductions of a plurality of offer sources, each of the plurality of offer sources containing at least one of the plurality of offers;

(b) source searching means for locating one or more of the electronic reproductions of the plurality of offer sources, the source searching means comprising:

(i) source display means for displaying a plurality of electronic offer source images, wherein the plurality of electronic offer source images represent identifying portions of the plurality of offer sources;

(ii) source filtering means for receiving source search criteria, and for causing the source display means to display those of the plurality of electronic offer source images which meet the source search criteria; and (iii) source selection means for allowing selection of one of the plurality of electronic offer source images which represents an identifying portion of one of the plurality of offer sources;

(c) offer searching means for locating the at least one of the plurality of offers associated with the selected electronic offer source image, the offer searching means comprising:

(i) source segment display means for displaying, in response to offer search criteria, one or more electronic images of a portion of the offer source represented by the selected electronic offer source image; and (ii) offer selection means for allowing selection of the at least one of the plurality of offers associated with the one or more electronic images displayed, whereby the user is enabled to locate the at least one of the plurality of offers by searching through an electronic equivalent of the offer source used by the person placing the order.

2. The computerized system of claim 1, wherein the source filtering means comprises source type filtering means for receiving source type search criteria, and for causing the source display means to display those of the plurality of electronic offer source images which meet the source type search criteria.

3. The computerized system of claim 2, wherein the source type filtering means comprises:

source type display means for displaying a selectable list of source types; and source type selection means for allowing selection of one of the source types in the selectable list.

4. The computerized system of claim 3, wherein the source types in the selectable list are selected from a group comprising one or more of catalogs, space ads, billboards, infomercials and television.

5. The computerized system of claim 2, wherein the source filtering means further comprises source group filtering means for receiving source group search criteria, and for causing the source display means to display those of the plurality of electronic offer source images which meet the source type search criteria and the source group search criteria.

6. The computerized system of claim 5, wherein the source group filtering means comprises:

source group display means for displaying a selectable list of source groups; and source group selection means for allowing selection of one of the source groups in the selectable list.

7. The computerized system of claim 1, wherein the source filtering means comprises date filtering means for receiving date search criteria, and for causing the source display means to display those of the plurality of electronic offer source images which meet the date search criteria.

8. The computerized system of claim 7, wherein the date filtering means comprises date range means for receiving date search criteria corresponding to a range of source issue dates.

9. The computerized system of claim 7, wherein the date filtering means comprises date order means for receiving date search criteria corresponding to an ascending date order and a descending date order.

10. The computerized system of claim 1, wherein the source filtering means comprises means for causing the source display means to display less than all of the plurality of electronic offer source images which meet the source search criteria at a time.

11. The computerized system of claim 10, wherein:

the plurality of electronic offer source images which meet the source search criteria include a first offer source image and a last offer source image; and the source filtering means comprises means for automatically locating at least one of the first offer source image and the last offer source image.

12. The computerized system of claim 10, wherein the source searching means further comprises scroll display means for scrolling through and displaying the remaining ones of the plurality of electronic offer source images which meet the source search criteria.

13. The computerized system of claim 1, wherein the offer selection means comprises:

offer choice display means for displaying a list of the plurality of offers associated with the one or more electronic images displayed by the source segment display means; and offer choice selection means for allowing selection of at least one of the plurality of offers from the list.

14. The computerized system of claim 1, wherein:

the portion of the offer source corresponds to one or more pages of a multi-page offer source; and the source segment display means comprises page view means for displaying the electronic images of the one or more pages.

15. The computerized system of claim 14, wherein the source segment display means further comprises page scrolling means for scrolling through all of the pages of the offer source represented by the selected electronic offer source image.

16. The computerized system of claim 14, wherein the source segment display means further comprises page indication means for specifying a particular one of the pages to be displayed.

17. The computerized system of claim 1, wherein the source segment display means further comprises source segment scrolling means for scrolling through all of the portions of the offer source represented by the selected electronic offer source image.

18. A computerized method for the placement of an order by a user for at least one of a plurality of offers via a terminal having a display, the method comprising the computer-executed steps of:
(a) storing offer information relating to the plurality of offers, and storing electronic reproductions of a plurality of offer sources, each of the plurality of offer sources containing at least one of the plurality of offers;
(b) locating one or more of the electronic reproductions of the plurality of offer sources, the step of locating one or more of the electronic reproductions comprising the steps of:
  (i) displaying a plurality of electronic offer source images, wherein the plurality of electronic offer source images represent identifying portions of the plurality of offer sources;
  (ii) entering source search criteria;
  (iii) displaying those of the plurality of electronic offer source images which meet the source search criteria; and
  (iv) selecting one of the plurality of electronic offer source images which represents an identifying portion of one of the plurality of offer sources;
(c) displaying one or more electronic images of a portion of the offer source represented by the selected electronic offer source image, in response to offer search criteria; and
(d) selecting the at least one of the plurality of offers which is associated with the one or more electronic images displayed, whereby the user is enabled to locate the at least one of the plurality of offers by searching through an electronic equivalent of the offer source used by the person placing the order.

19. The computerized method of claim 18, wherein:
the step of entering source search criteria comprises the step of entering source type search criteria; and
the step of displaying those of the plurality of electronic offer source images which meet the source search criteria comprises the step of displaying those of the plurality of electronic offer source images which meet the source type search criteria.

20. The computerized method of claim 19, wherein the step of entering source type search criteria comprises the steps of:
displaying a selectable list of source types; and
selecting one of the source types in the selectable list of source types.

21. The computerized method of claim 20, wherein the source types in the selectable list are selected from a group comprising one or more of catalogs, space ads, billboards, infomercials and television.

22. The computerized method of claim 19, wherein:
the step of entering source search criteria further comprises the step of entering source group search criteria; and
the step of displaying those of the plurality of electronic offer source images which meet the source search criteria comprises the step of displaying those of the plurality of electronic offer source images which meet the source type search criteria and the source group search criteria.

23. The computerized method of claim 22, wherein the step of entering source group search criteria comprises the steps of:
displaying a selectable list of source groups; and
selecting one of the source groups in the selectable list of source groups.

24. The computerized method of claim 18, wherein:
the step of entering source search criteria comprises the step of entering date search criteria; and
the step of displaying those of the plurality of electronic offer source images which meet the source search criteria comprises the step of displaying those of the plurality of electronic offer source images which meet the date search criteria.

25. The computerized method of claim 24, wherein the step of entering date search criteria comprises the step of entering a range of dates corresponding to a range of source issue dates.

26. The computerized method of claim 24, wherein the step of entering date search criteria comprises the step of entering date order search criteria for searching by ascending dates and descending dates.

27. The computerized method of claim 18, wherein the step of displaying those of the plurality of electronic offer source images which meet the source search criteria comprises the step of displaying less than all of the electronic offer source images which meet the source search criteria at one time.

28. The computerized method of claim 27, wherein the step of displaying less than all of the electronic offer source images further comprises the step of scrolling through and displaying the remaining ones of the electronic offer source images which meet the source search criteria.

29. The computerized method of claim 18, wherein the step selecting the at least one of the plurality of offers comprises the steps of:
displaying an offer list of the plurality of offers associated with the one or more electronic images displayed by the step of displaying one or more electronic images; and
selecting at least one of the plurality of offers from the offer list.

30. The computerized method of claim 18, wherein:
the portion of the offer source corresponds to one or more pages of a multi-page offer source; and
the step of displaying one or more electronic images of a portion of the offer source comprises the step of displaying electronic page images of the one or more pages of the multi-page offer source.

31. The computerized method of claim 30, wherein the step of displaying electronic page images further comprises the step of scrolling through all of the pages of the multi-page offer source.

32. The computerized method of claim 31, wherein the step of scrolling through all of the pages includes the step of scrolling through the pages one page at a time in an ascending order.

33. The computerized method of claim 31, wherein the step of scrolling through all of the pages includes the step of scrolling through the pages one page at a time in a descending order.

34. The computerized method of claim 31, wherein the step of displaying electronic page images further comprises the step of specifying a particular one of the pages to be displayed.

* * * * *

UNITED STATES PATENT AND TRADEMARK OFFICE
CERTIFICATE OF CORRECTION

PATENT NO. : 5,832,459
DATED       : NOVEMBER 3, 1998
INVENTOR(S): CAMERON ET AL.

It is certified that error appears in the above-identified patent and that said Letters Patent is hereby corrected as shown below:

Col. 5, line 4: "direction" should read --directing--

Col. 5, line 6: insert --devices-- after the word "entry"

Col. 6, line 1: "organization' " should read --organization's--

Col. 6, line 58: "SB" should read --5B--

Col. 9, line 4: "customer' " should read --customer's--

Col. 10, line 15: "customer' " should read --customer's--

Col. 10, line 56: "customer' " should read --customer's--

Col. 11, line 27: "customer' " should read --customer's--

Col. 17, line 1: "offer' " should read --offer's--

Signed and Sealed this

Tenth Day of April, 2001

*Attest:*

NICHOLAS P. GODICI

*Attesting Officer*  Acting Director of the United States Patent and Trademark Office